US012794602B2

(12) United States Patent
Lee et al.

(10) Patent No.: US 12,794,602 B2
(45) Date of Patent: Nov. 10, 2026

(54) HARQ-ACK INFORMATION IN WIRELESS COMMUNICATION

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 18/579,193

(22) PCT Filed: Aug. 5, 2022

(86) PCT No.: PCT/KR2022/011612
§ 371 (c)(1),
(2) Date: Jan. 12, 2024

(87) PCT Pub. No.: WO2023/014139
PCT Pub. Date: Feb. 9, 2023

(65) Prior Publication Data

US 2024/0322951 A1 Sep. 26, 2024

(30) Foreign Application Priority Data

Aug. 5, 2021 (KR) ........................ 10-2021-0103473

(51) Int. Cl.
*H04L 1/1829* (2023.01)
*H04W 72/232* (2023.01)
*H04W 72/30* (2023.01)

(52) U.S. Cl.
CPC ......... *H04L 1/1864* (2013.01); *H04W 72/232* (2023.01); *H04W 72/30* (2023.01)

(58) Field of Classification Search
CPC ... H04L 1/1864; H04L 5/0044; H04L 5/0055; H04L 1/1854; H04L 1/1861; H04L 1/1896; H04L 1/18; H04W 72/232; H04W 72/30
See application file for complete search history.

(56) References Cited

U.S. PATENT DOCUMENTS

2021/0211241 A1* 7/2021 Xiong .................... H04L 1/1819
2023/0147173 A1* 5/2023 Matsumura ........... H04L 1/1887
370/329
2024/0073894 A1* 2/2024 Lei ......................... H04L 1/0061

FOREIGN PATENT DOCUMENTS

KR 10-2019-0105083 9/2019
KR 10-2020-0018353 2/2020

OTHER PUBLICATIONS

Extended European Search Report in European Appln. No. 22853514.2, mailed on Jun. 18, 2025, 8 pages.

(Continued)

*Primary Examiner* — Nizam U Ahmed
(74) *Attorney, Agent, or Firm* — Fish & Richardson P.C.

(57) ABSTRACT

Disclosed are a method and device for transmitting or receiving hybrid automatic repeat and request acknowledgement (HARQ-ACK) information in a wireless communication system. A method for a terminal to transmit HARQ-ACK information in a wireless communication system according to an embodiment disclosed herein may comprise the steps of: receiving, from a network, a first multicast physical downlink shared channel (PDSCH) based on a first multicast downlink control indicator (DCI) format; receiving, from the network, a second multicast PDSCH based on a second multicast DCI format; and multiplexing first HARQ-ACK information on the first multicast PDSCH with second HARQ-ACK information on the second multicast PDSCH, and transmitting the multiplexed information to the (Continued)

network through a physical uplink control channel (PUCCH), wherein the second multicast DCI format is received after the first multicast DCI format is received, and the PUCCH resource is determined using the first multicast DCI format.

8 Claims, 11 Drawing Sheets

(56) References Cited

OTHER PUBLICATIONS

Moderator (Huawei), "FL summary#1 on improving reliability for MBS for RRC_CONNECTED UEs," R1-2103834, 3GPP TSG RAN WG1 Meeting #104bis-e, E-meeting, Apr. 12-20, 2021, 44 pages.
Qualcomm Incorporated, "Views on UE feedback for Multicast RRC_CONNECTED UEs," R1-2103187, 3GPP TSG RAN WG1 #104bis, e-Meeting, Apr. 12-20, 2021, 7 pages.
CMCC, "Discussion on reliability improvement," 3GPP TSG RAN WG1 #104b-e, R1-2102901, e-Meeting, Apr. 12-20, 2021, 10 pages.
International Search Report and Written Opinion in Appln. No. PCT/KR2022/011612, mailed on Nov. 16, 2022, 6 pages (with English translation).
OPPO, "Pucch resource allocation for UL feedback in MBMS," 3GPP TSG RAN WG1 #103-e, R1-2008245, e-Meeting, Oct. 26-Nov. 13, 2020, 4 pages.
Samsung, "On mechanisms to improve reliability for RRC_CONNECTED UEs," 3GPP TSG RAN WG1 #105, R1-2105337, e-Meeting, May 19-27, 2021, 7 pages.

* cited by examiner

HARQ-ACK INFORMATION IN WIRELESS COMMUNICATION

CROSS-REFERENCE TO RELATED APPLICATIONS

This application is a National Stage application under 35 U.S.C. § 371 of International Application No. PCT/KR2022/011612, filed on Aug. 5, 2022, which claims the benefit of Korean Application No. 10-2021-0103473, filed on Aug. 5, 2021. The disclosures of the prior applications are incorporated by reference in their entirety.

TECHNICAL FIELD

The present disclosure relates to a wireless communication system, and more particularly, to a method and a device for transmitting or receiving HARQ-ACK information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE SUMMARY

A technical problem of the present disclosure is to provide a method and a device for multiplexing and transmitting or receiving HARQ-ACK information in various reporting modes in a wireless communication system.

An additional technical problem of the present disclosure is to provide a method and a device for transmitting or receiving HARQ-ACK information in various reporting modes based on at least one of multiplexing, dropping, partial selection or separation in a wireless communication system.

The technical objects to be achieved by the present disclosure are not limited to the above-described technical objects, and other technical objects which are not described herein will be clearly understood by those skilled in the pertinent art from the following description.

A method for transmitting HARQ-ACK information by a terminal in a wireless communication system according to an aspect of the present disclosure includes receiving from a network a first multicast physical downlink shared channel (PDSCH) based on a first multicast downlink control information (DCI) format; receiving from the network a second multicast PDSCH based on a second multicast DCI format; and multiplexing and transmitting to the network, through a physical uplink control channel (PUCCH), first HARQ-ACK information on the first multicast PDSCH and second HARQ-ACK information on the second multicast PDSCH, and based on the second multicast DCI format being received after the first multicast DCI format, the PUCCH resource may be determined by using the first multicast DCI format.

A method for receiving HARQ-ACK information by a base station in a wireless communication system according to an additional aspect of the present disclosure includes transmitting to at least one terminal a first multicast physical downlink shared channel (PDSCH) based on a first multicast downlink control information (DCI) format; transmitting to the at least one terminal a second multicast PDSCH based on a second multicast DCI format; and receiving, from a specific terminal, a physical uplink control channel (PUCCH) that first HARQ-ACK information on the first multicast PDSCH and second HARQ-ACK information on the second multicast PDSCH are multiplexed, and based on the second multicast DCI format being transmitted after the first multicast DCI format, the PUCCH resource may be determined by using the first multicast DCI format.

According to the present disclosure, a method and a device for multiplexing and transmitting or receiving HARQ-ACK information in various reporting modes in a wireless communication system may be provided.

According to the present disclosure, a method and a device for transmitting or receiving HARQ-ACK information in various reporting modes based on at least one of multiplexing, dropping, partial selection or separation in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
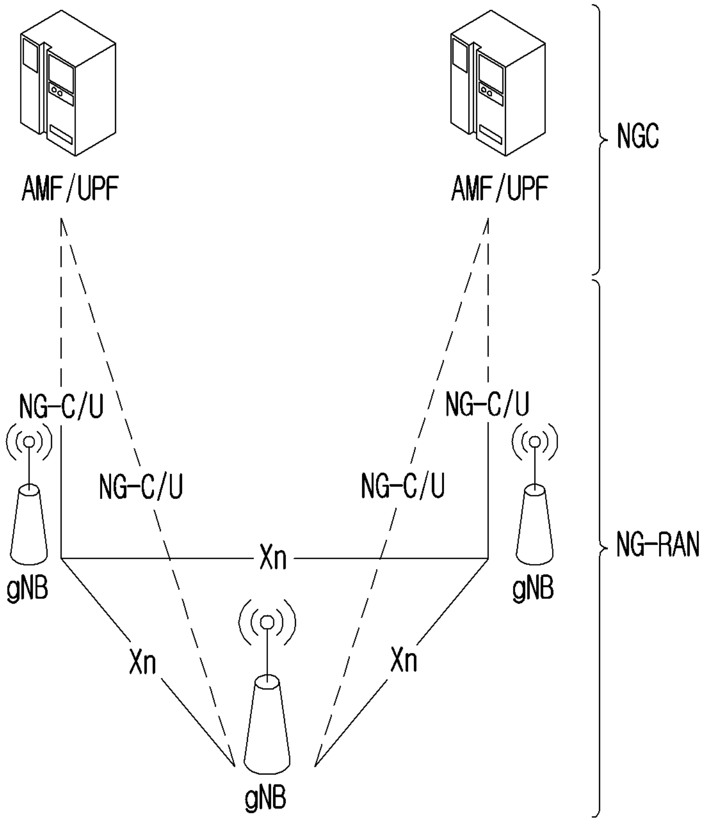
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
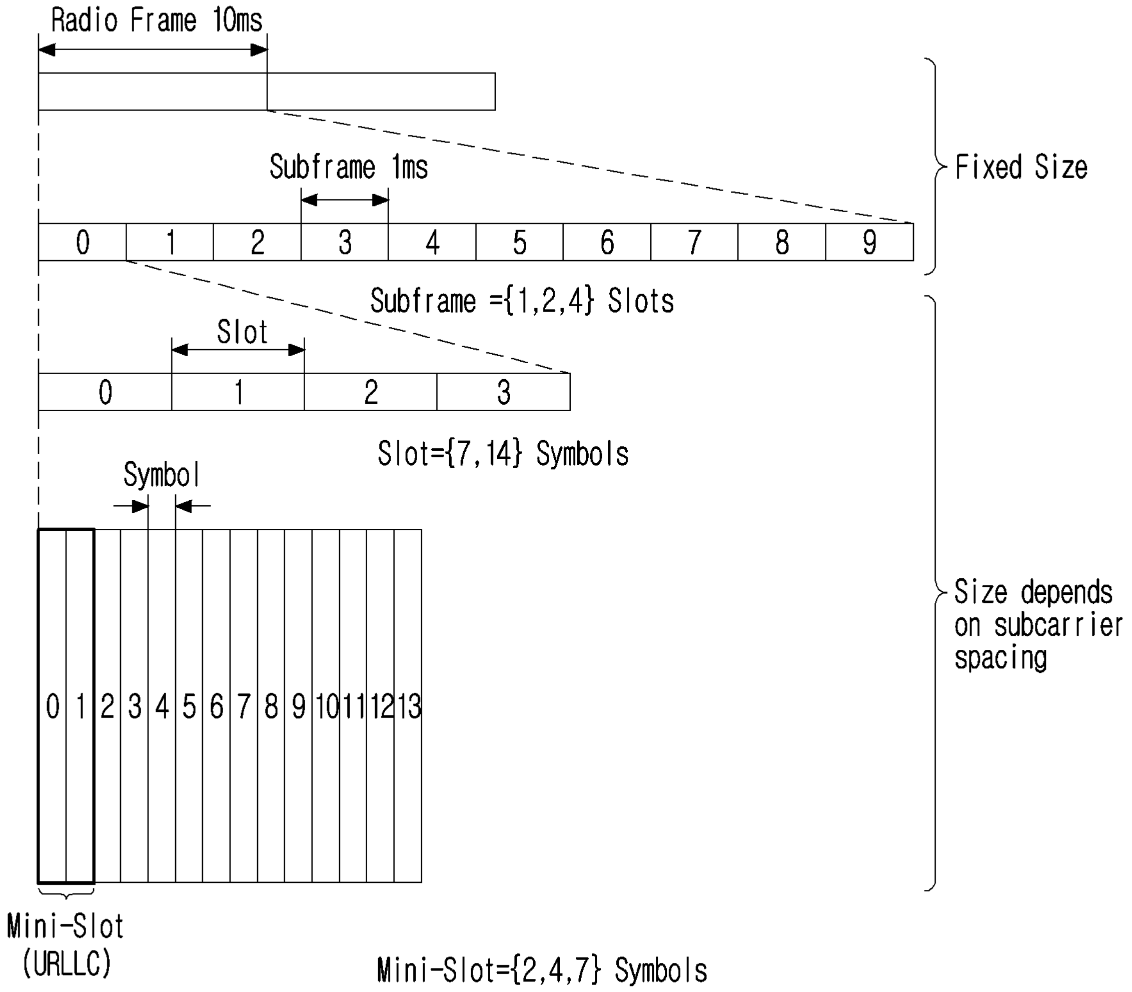
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})\ T_c$ than a corresponding downlink frame in a corresponding terminal starts. For a subcarrier spacing configuration μ, slots are numbered in an increasing order of $n_s\mu\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
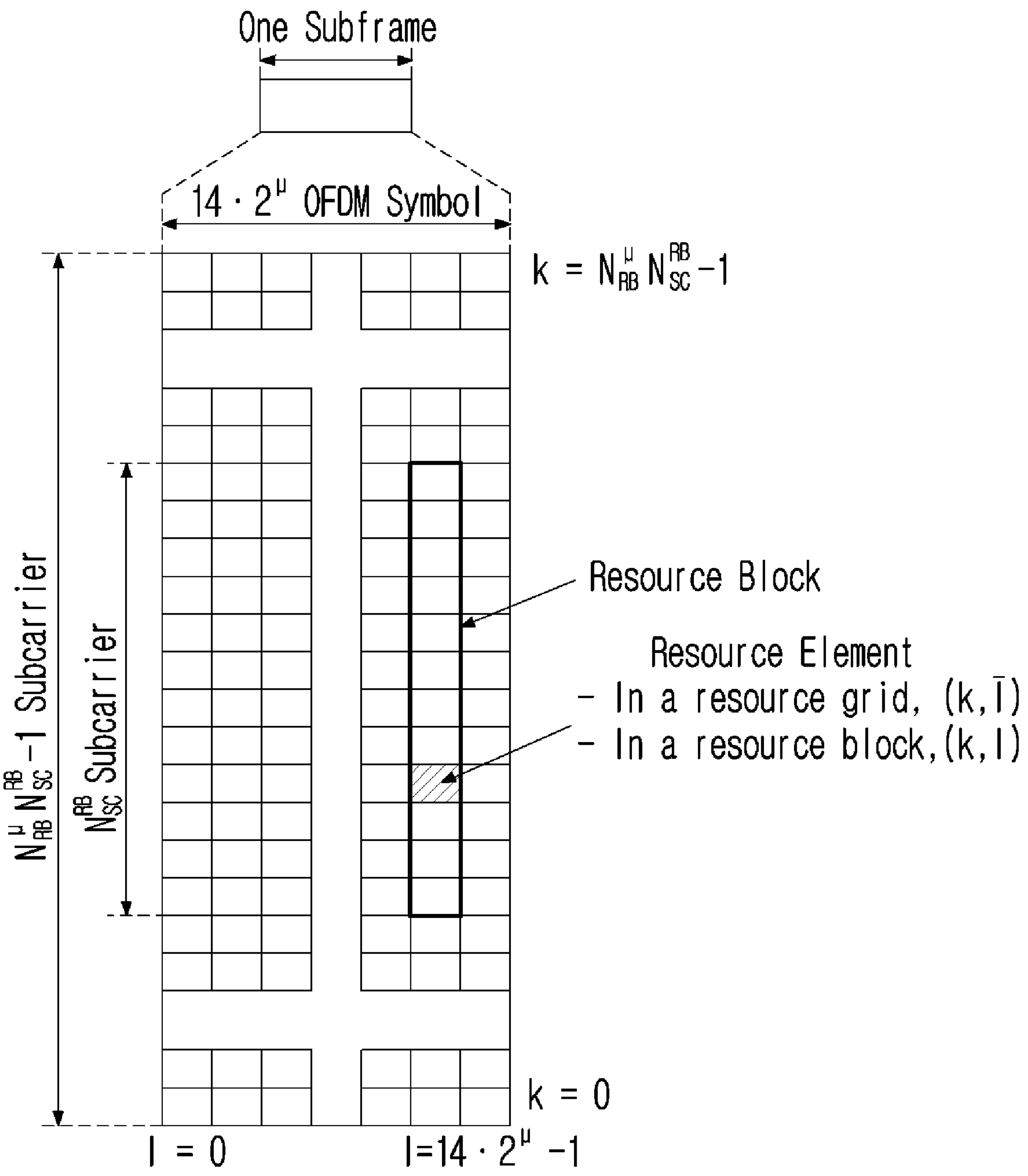
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{ss}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\le N_{RB}^{max,\mu}$. The $N_{RB}^{max,\mu}$ represents a maximum transmission bandwidth, which may be different between an uplink and a downlink as well as between numerologies. In this case, one resource grid may be configured per and antenna port p. Each element of a resource grid for and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

- offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.
- absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
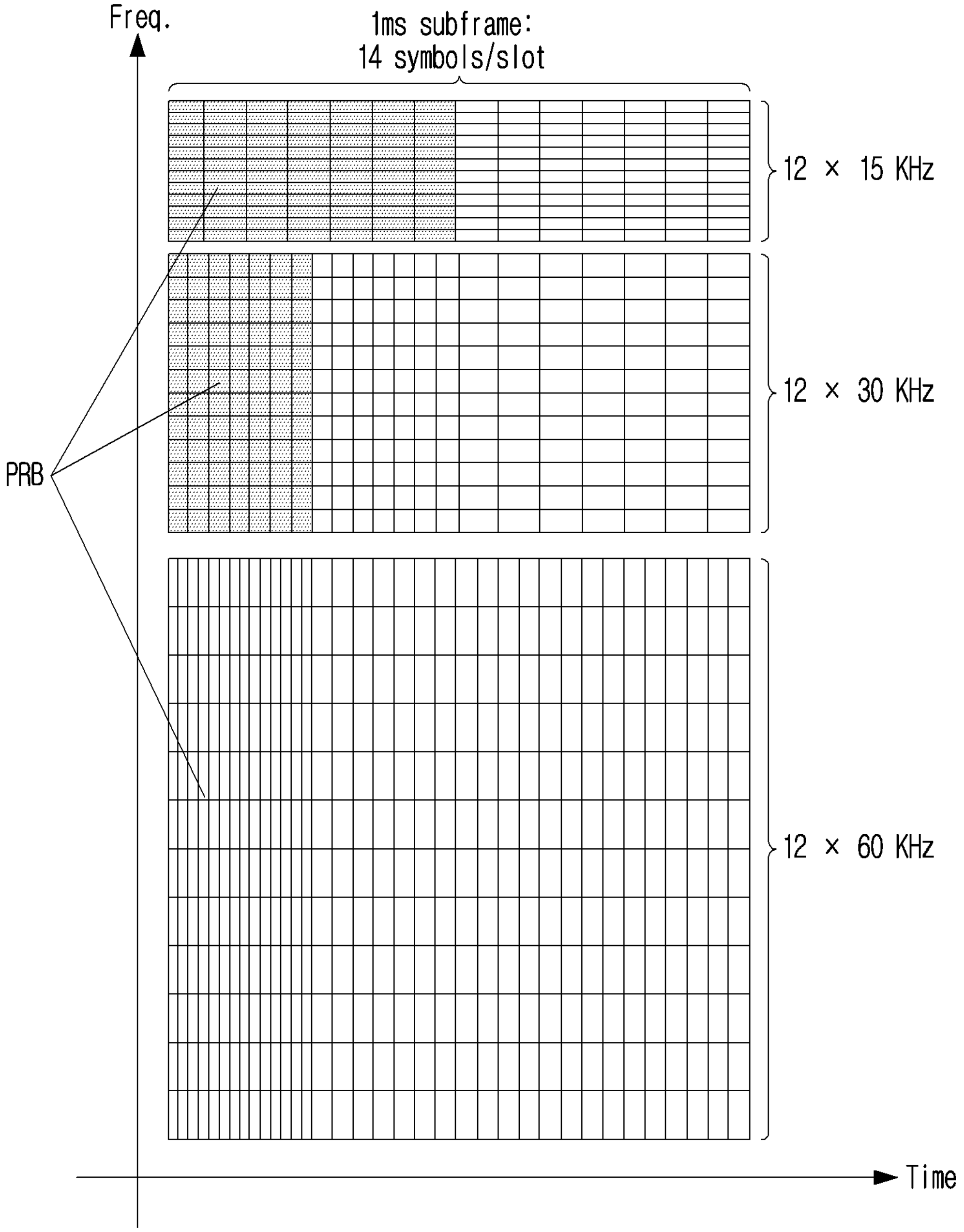
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
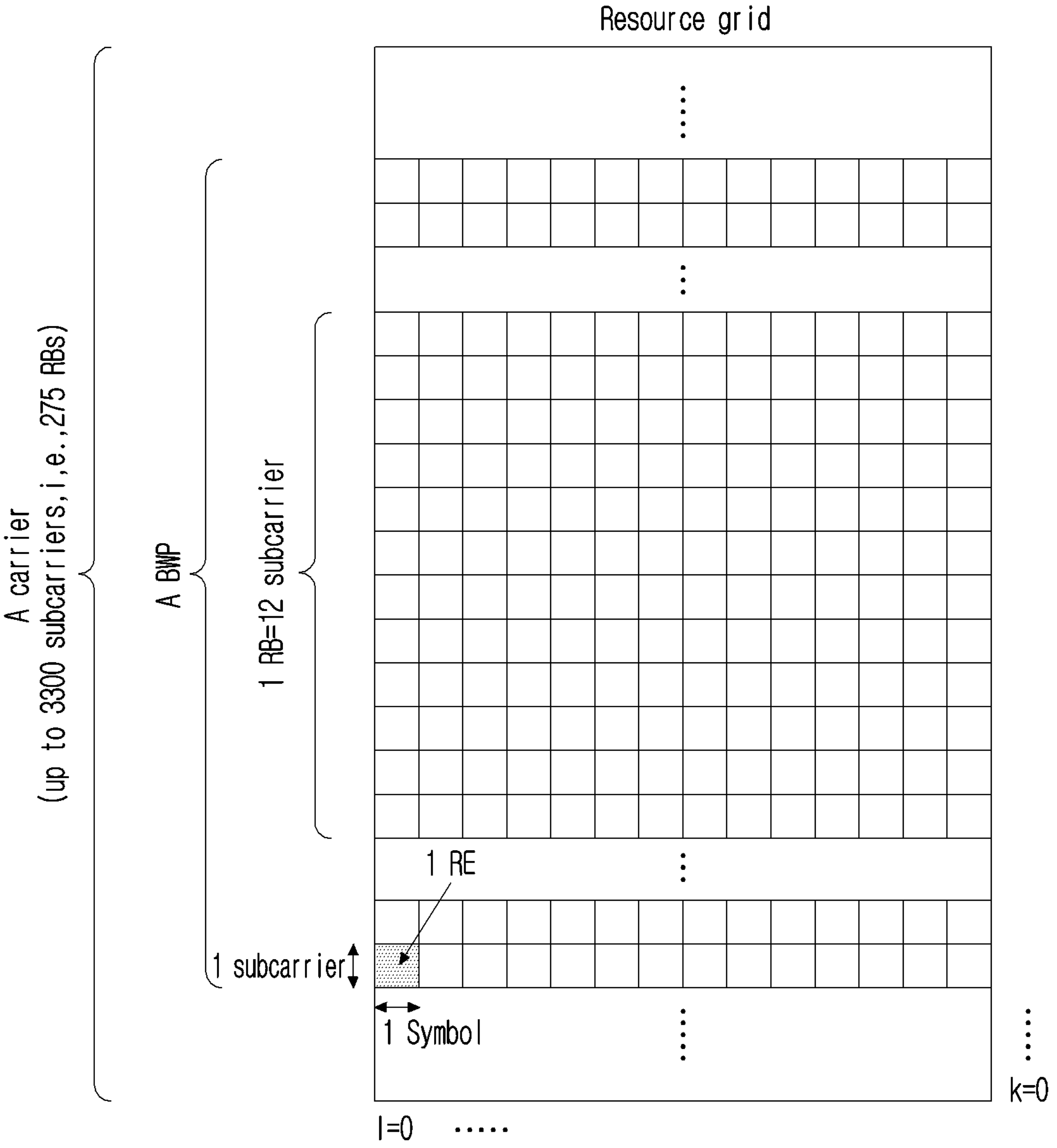
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
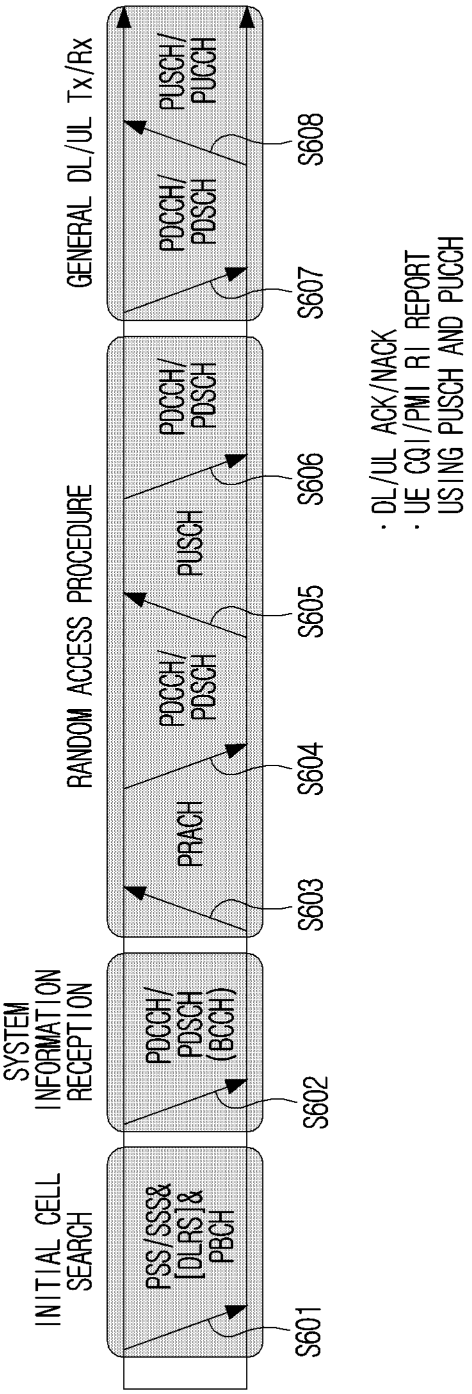
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast Multicast Service)

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

SFN scheme may be used to provide a broadcast service to a wide area (e.g., MBMS area) through resources allocated semi-statically in advance. A multicast broadcast single frequency network (MBSFN) provides logical channels, a multicast control channel (MCCH) and a multicast traffic channel (MTCH), and both of the MCCH and the MTCH are mapped to a transport channel, a multicast channel (MCH), and the MCH is mapped to a physical channel, a physical multicast channel (PMCH). That is, a plurality of base stations/cells may be synchronized to provide the same data to a terminal through the PMCH. One base station/cell may belong to a plurality of MBSFN areas. In addition, it may be required to configure the MBSFN subframe for the MBSFN service.

SC-PTM scheme may be mainly used to provide a broadcast service only within a cell coverage through dynamic resources. SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting data corresponding to the SC-MCCH or SC-MTCH is scheduled through a PDCCH that is CRC scrambled with a group-radio network temporary identifier (G-RNTI). Here, a temporary mobile group identity (TMGI) corresponding to the MBMS service ID may be mapped one-to-one with a specific G-RNTI value. Accordingly, if the base station provides a plurality of MBMS services, a plurality of G-RNTI values may be allocated for SC-PTM transmission. One or more terminals may perform PDCCH monitoring using a specific G-RNTI to receive a specific MBMS service. Here, a discontinuous reception (DRX) on-duration period dedicated to SC-PTM may be configured for a specific MBMS service/specific G-RNTI. In this case, the corresponding terminals may wake up only for a specific on-duration period and perform PDCCH monitoring for the G-RNTI.

SPS (Semi-Persistent Scheduling)

The base station may provide a specific terminal with SPS configuration dedicated to the terminal, and allocate one or more downlink SPS transmission resources that are repeated according to a configured period. DCI of terminal-dedicated (or terminal-specific) PDCCH may indicate activation (SPS activation) of a specific SPS configuration index. The terminal may perform downlink reception through the activated SPS transmission resource. Such SPS transmission resource may be used for initial HARQ transmission. The base station may allocate a retransmission resource of a specific SPS configuration index through DCI of PDCCH dedicated to a terminal. For example, when the terminal reports HARQ NACK for the SPS transmission resource, the base station may allocate the retransmission resource through DCI so that the terminal may receive downlink retransmission.

DCI of PDCCH dedicated to a terminal may indicate release or deactivation of a specific SPS configuration index. In this case, the corresponding terminal does not receive the SPS transmission resource for which release/deactivation is indicated.

CRC of DCI/PDCCH for activation/retransmission/deactivation for SPS configuration/resource may be scrambled by configured scheduling-radio network temporary identifier (CS-RNTI).

MBS (Multicast Broadcast Service)

In the NR-based wireless communication system, introduction of a new MBS-based DL broadcast or DL multicast transmission scheme, which is distinct from the aforementioned MBMS (e.g., MBSFN or SC-PTM), is being discussed. For example, the network side (e.g., base station/cell/TRP) may provide a point-to-multipoint (PTM) transmission scheme and a point-to-point (PTP) transmission scheme for DL broadcast or DL multicast transmission.

In the PTM transmission scheme for MBS, the base station may transmit a group common (or group-specific) PDCCH and a group common PDSCH to a plurality of terminals. A plurality of terminals may simultaneously receive the same group common PDCCH transmission and group common PDSCH transmission, and decode the same MBS data.

In the PTP transmission scheme for MBS, the base station may transmit a terminal-dedicated (or terminal-specific) PDCCH and a terminal-dedicated PDSCH to a specific terminal. The corresponding single terminal may receive the terminal-dedicated PDCCH and a terminal-dedicated PDSCH. When there are a plurality of terminals receiving the same MBS service, the base station may individually transmit the same MBS data to each of the plurality of terminals through different terminal-dedicated PDCCHs and terminal-dedicated PDSCHs.

In a PTM transmission method, a base station may transmit a plurality of group common PDSCHs to terminals. A base station may receive a terminal's HARQ-ACK for a group common PDSCH through a terminal-dedicated PUCCH resource.

When a terminal successfully decodes a transport block (TB) for a group common PDSCH, a terminal may transmit an ACK value as HARQ-ACK information. When a terminal fails to successfully decode a TB for a unicast PDSCH or a group common PDSCH, a terminal may transmit a NACK value as HARQ-ACK information. This HARQ-ACK transmission method may be referred to as an ACK/NACK-based HARQ-ACK method. ACK/NACK-based HARQ-ACK information may be generally transmitted through a terminal-dedicated PUCCH resource.

A NACK only-based HARQ-ACK method may be applied/configured for a group common PDSCH. For example, a terminal may not transmit a PUCCH in case of an ACK value (i.e., when it succeeds in decoding for a received PDSCH) and may transmit a PUCCH only in case of a NACK value (i.e., when it fails in decoding for a received PDSCH). NACK only-based HARQ-ACK information may be generally transmitted through a group common PUCCH resource. When multiple HARQ-ACKs are transmitted in a NACK only based HARQ-ACK method, if only an ACK value is included, HARQ-ACK information may not be transmitted and if even one NACK value is included, HARQ-ACK information may be transmitted.

In examples below, ACK/NACK-based HARQ-ACK may be referred to as HARQ-ACK information based on a first HARQ-ACK reporting mode and NACK only-based HARQ-ACK may be referred to as HARQ-ACK information based on a second HARQ-ACK reporting mode. In addition, a DCI format that is CRC-scrambled by a G-RNTI or a G-CS-RNTI may be referred to as a group common DCI format or a multicast DCI format. A group common/multicast DCI format may be also referred to as a group common/multicast PDCCH and a PDSCH scheduled thereby may be referred to as a group common/multicast PDSCH.

For example, a terminal may receive unicast traffic through a terminal-dedicated unicast PDSCH and may receive multicast traffic like a MBS through a group common multicast PDSCH. A terminal may transmit unicast HARQ-ACK for a unicast PDSCH and transmit multicast HARQ-ACK for a multicast PDSCH. If PUCCH transmission for unicast HARQ-ACK and PUCCH transmission for multicast HARQ-ACK are overlapped or should be transmitted in the same slot, there is a problem in which it is not clear how a terminal that may not transmit two PUCCHs simultaneously will transmit unicast HARQ-ACK and multicast HARQ-ACK. In particular, when multicast HARQ-ACK is configured as NACK only-based HARQ-ACK, there is a problem in which it is not clear how a plurality of HARQ-ACKs are transmitted under a situation where NACK only-based HARQ-ACK and ACK/NACK-based HARQ-ACK transmission are overlapped or should be transmitted to the same slot.

In the present disclosure, an ACK/NACK-based HARQ-ACK transmission method is not limited to HARQ-ACK for a unicast PDCCH/PDSCH, and as described above, an ACK/NACK-based HARQ-ACK transmission method may be also applied to HARQ-ACK for a multicast PDCCH/PDSCH.

In the present disclosure, for a case in which unicast HARQ-ACK information and multicast HARQ-ACK information (e.g., at least one of ACK/NACK-based HARQ-ACK information or NACK only-based HARQ-ACK information) collide in the same time unit, various examples of transmitting or receiving HARQ-ACK by applying at least one method of multiplexing, dropping, partial selection or separation are described.

For example, when NACK only-based HARQ-ACK and ACK/NACK-based HARQ-ACK transmission are overlapped or should be transmitted to the same slot, a plurality of HARQ-ACKs may be multiplexed into one PUCCH or may be transmitted by being divided into a plurality of PUCCHs.

For example, a terminal may be configured to transmit HARQ-ACK according to one of methods described below or transmit HARQ-ACK according to a combination of at least two of methods described below.

For example, a method of dropping HARQ-ACK with low priority (LP) and transmitting HARQ-ACK with high priority (HP) for all overlapping unicast HARQ-ACK and multicast HARQ-ACK may be applied/configured.

For example, the following options may be considered for overlapping unicast HARQ-ACK and multicast HARQ-ACK transmission.

Option 1: A terminal may preferentially transmit unicast HARQ-ACK and drop multicast HARQ-ACK.

Option 2: A base station may determine what will be transmitted and what will be dropped preferentially among unicast HARQ-ACK and multicast HARQ-ACK and configure/indicate it to a terminal.

Option 3: A priority indicated by the last received DCI for unicast HARQ-ACK and a priority indicated by the last received DCI for multicast HARQ-ACK may be compared to transmit unicast HARQ-ACK or multicast HARQ with high priority and drop the remaining HARQ-ACK.

Option 4: Among unicast HARQ-ACK and multicast HARQ-ACK, one with a small HARQ-ACK payload may be dropped and one with a large HARQ-ACK payload may be transmitted.

In addition, when ACK (only) is indicated for NACK only-based HARQ-ACK (i.e., when actual PUCCH transmission is not required), a terminal may determine that there is no collision with another HARQ-ACK or SR/CSI reporting, etc. Alternatively, even when ACK (only) is indicated for NACK only-based HARQ-ACK (i.e., when actual PUCCH transmission is not required), it may be determined that it may conflict with another HARQ-ACK or SR/CSI reporting, etc. by assuming it is virtually transmitted. In determining whether a terminal collides with another UCI, a base station may configure to a terminal whether NACK only-based HARQ-ACK will be considered to be actually transmitted or whether it will be considered to be virtually transmitted regardless of actual transmission.

Figure 7:
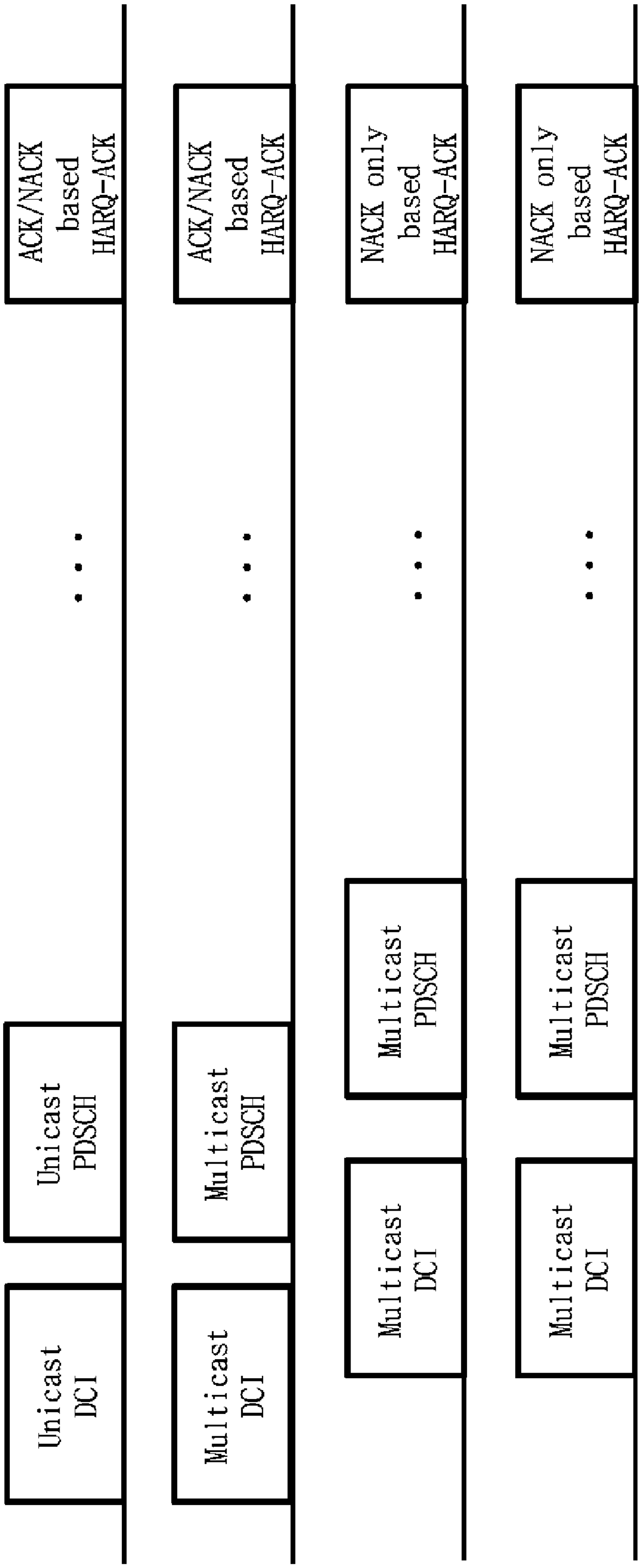
FIG. 7 illustratively shows an overlapping situation of HARQ-ACK in various reporting methods to which the present disclosure may be applied.

FIG. 7 illustratively shows an overlapping situation of HARQ-ACK in various reporting methods to which the present disclosure may be applied.

In an example of FIG. 7, DCI (or a PDCCH), a PDSCH scheduled thereby and HARQ-ACK therefor are indicated on the same line. In other words, in FIG. 7, four sets of associated/corresponding DCI (a PDCCH), a PDSCH and HARQ-ACK are shown. Although a horizontal axis is associated with time, it is not intended to represent an absolute or relative time position.

In an example of FIG. 7, unicast DCI may be CRC-scrambled by a C-RNTI and multicast DCI may be CRC-scrambled by a G-RNTI. unicast DCI and/or multicast DCI may indicate a HP or a LP. In addition, it is shown that HARQ-ACK for unicast DCI/PDSCH is ACK/NACK-based HARQ-ACK and HARQ-ACK for multicast DCI/PDSCH is ACK/NACK-based HARQ-ACK or NACK only-based HARQ-ACK. In addition, an example of FIG. 7 illustratively represents a situation where 4 types of HARQ, unicast associated ACK/NACK-based HARQ-ACK, multicast associated ACK/NACK-based HARQ-ACK, multicast associated NACK only-based HARQ-ACK and multicast associated NACK only-based HARQ-ACK, are overlapped (or are transmitted in the same slot).

For example, a unicast PDCCH/PDSCH and a multicast PDCCH/PDSCH or a multicast PDCCH/PDSCH scheduled by a different G-RNTI and a multicast PDCCH/PDSCH may be received through FDM or TDM. In this case, unicast HARQ-ACK for a unicast PDCCH/PDSCH and multicast HARQ-ACK for a multicast PDCCH/PDSCH may be transmitted in the same slot. Here, since multicast HARQ-ACK may be configured as NACK only-based HARQ-ACK, from a terminal's perspective, a situation may occur where NACK only-based HARQ-ACK and ACK/NACK-based HARQ-ACK transmission are overlapped or should be transmitted in the same slot.

In the present disclosure, various examples are described in which a terminal transmits only NACK only-based HARQ-ACK, transmits only ACK/NACK-based HARQ-ACK, multiplexes NACK only-based HARQ-ACK and ACK/NACK-based HARQ-ACK and transmits them to one PUCCH or (divides and) transmits them to a plurality of PUCCHs according to a terminal's capability under these situation.

Figure 8:
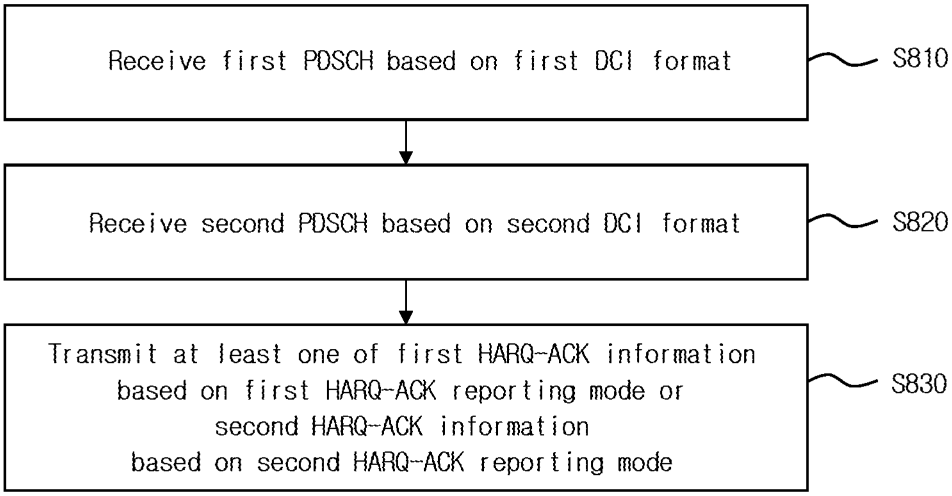
FIG. 8 is a diagram for describing a HARQ-ACK transmission method of a terminal according to an embodiment of the present disclosure.

FIG. 8 is a diagram for describing a HARQ-ACK transmission method of a terminal according to an embodiment of the present disclosure.

In S810, a terminal may receive a first PDSCH based on a first DCI format.

In S820, a terminal may receive a second PDSCH based on a second DCI format.

In S830, a terminal may transmit at least one of first HARQ-ACK information for a first PDSCH or second HARQ-ACK information for a second PDSCH. For example, first and second HARQ-ACK information may be multiplexed or only some of them may be selected and transmitted or some may be dropped and only the rest may be transmitted or each may be separated and transmitted.

A first DCI format and a second DCI format may be a unicast DCI format and a multicast DCI format, a multicast DCI format and a unicast DCI format or a multicast DCI format and a multicast DCI format, respectively.

Both a first DCI format and a second DCI format may be a multicast DCI format, a first PDSCH and a second PDSCH may be a multicast PDSCH, first HARQ-ACK information may be based pm a first HARQ-ACK reporting mode (e.g., ACK/NACK-based) and second HARQ-ACK information may be based on a second HARQ-ACK reporting mode (e.g., NACK only-based). In this case, first and second HARQ-ACK information may be multiplexed and transmitted through one PUCCH and a PUCCH resource may be determined based on a first DCI format associated with first HARQ-ACK information (e.g., based on a PRI in a DCI format).

For example, even when a first DCI format is received first and a second DCI format is received late in a terminal, a PUCCH resource may be determined based on a first DCI format associated with a first HARQ-ACK reporting mode (i.e., an ACK/NACK-based HARQ-ACK transmission method).

For example, when a second DCI format is received first and a first DCI format is received late in a terminal, a PUCCH resource may be determined based on a first DCI format associated with a first HARQ-ACK reporting mode (i.e., an ACK/NACK-based HARQ-ACK transmission method).

If DCI formats associated with a plurality of HARQ-ACK information in a first HARQ-ACK reporting mode are received in a terminal, a PUCCH resource may be determined based on a last DCI format in time among them.

In an example described by referring to FIG. 8, a terminal may additionally receive a third PDSCH based on a third DCI format and third HARQ-ACK information for a third PDSCH may be transmitted by being multiplexed, dropped, selected and separated when it is overlapped with first or second HARQ-ACK.

Figure 9:
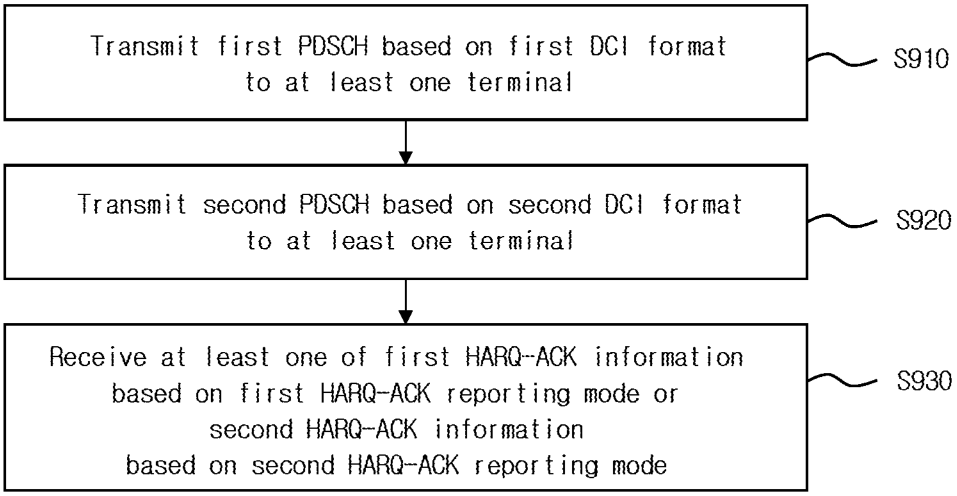
FIG. 9 is a diagram for describing a HARQ-ACK reception method of a base station according to an embodiment of the present disclosure.

FIG. 9 is a diagram for describing a HARQ-ACK reception method of a base station according to an embodiment of the present disclosure.

In S910, a base station may transmit a first PDSCH based on a first DCI format to at least one terminal.

In S920, a base station may transmit a second PDSCH based on a second DCI format to at least one terminal.

In S930, a base station may receive at least one of first HARQ-ACK information for a first PDSCH or second HARQ-ACK information for a second PDSCH from a specific terminal. For example, first and second HARQ-ACK information may be multiplexed or only some of them may be selected and transmitted or some may be dropped and only the rest may be transmitted or each may be separated and transmitted.

Since examples described in FIG. 8 may be equally applied to various transmission methods of HARQ-ACK information associated with a DCI format of FIG. 9, an overlapping description is omitted.

Hereinafter, multiplexing, dropping, selection and separate transmission of various HARQ-ACK information including the above-described contents that may be applied to an example in FIG. 8 and FIG. 9 are described.

Hereinafter, in the present disclosure, specific examples of transmission methods for NACK only-based HARQ-ACK and ACK/NACK-based HARQ-ACK of a terminal are described. For example, a terminal may transmit at least one of at least one NACK only-based HARQ-ACK or at least one ACK/NACK-based HARQ-ACK based on a combination of at least one of the following methods according to a configuration of a base station. In examples below, a PUCCH resource transmitting only NACK only-based HARQ-ACK may be determined based on DCI scheduling a PDSCH for NACK only-based HARQ-ACK and a PUCCH configuration for NACK only-based HARQ-ACK.

Embodiment 1

This embodiment relates to NACK only-based HARQ-ACK and ACK/NACK-based HARQ-ACK transmission with the same priority.

When NACK only-based HARQ-ACK and ACK/NACK-based HARQ-ACK transmission with the same priority are overlapped or should be transmitted to the same slot, examples of a priority-based HARQ-ACK codebook configuration method of a terminal are described.

Embodiment 1A

NACK only-based HARQ-ACK may be transformed into ACK/NACK-based HARQ-ACK and may be multiplexed with another ACK/NACK-based HARQ-ACK. Transforming NACK only-based HARQ-ACK into ACK/NACK-based HARQ-ACK may include providing first HARQ-ACK information based on an ACK/NACK HARQ-ACK reporting mode before first HARQ-ACK information based on a NACK only HARQ-ACK reporting mode is multiplexed with second HARQ-ACK information based on a ACK/NACK HARQ-ACK reporting mode.

A terminal may multiplex transformed NACK only-based HARQ-ACK with a PUCCH resource of ACK/NACK-based HARQ-ACK. In other words, NACK only-based HARQ-ACK that is transmitted only in case of NACK may be transformed into ACK/NACK-based HARQ-ACK that is transmitted both in case of ACK or NACK. Transformed HARQ-ACK may be multiplexed with another (ACK/NACK) HARQ-ACK to configure one codebook or one sub-codebook. In particular, a terminal that may not transmit at least two PUCCHs simultaneously may be configured in this way.

Here, a PUCCH resource of ACK/NACK-based HARQ-ACK may be determined based on PUCCH resource indicator (PRI) information of a DCI format scheduling a corresponding PDSCH.

In the above example, a DCI format associated with ACK/NACK-based HARQ-ACK information (i.e., scheduling a corresponding PDSCH) may be received first and a DCI format associated with NACK only-based HARQ-ACK information (i.e., scheduling a corresponding PDSCH) may be received later. Alternatively, a DCI format associated with ACK/NACK-based HARQ-ACK information (i.e., scheduling a corresponding PDSCH) may be received later and a DCI format associated with NACK only-based HARQ-ACK information (i.e., scheduling a corresponding PDSCH) may be received first. In both cases, a PUCCH resource may be determined based on ACK/NACK-based HARQ-ACK information (or based on a DCI format associated with ACK/NACK-based HARQ-ACK information).

According to a configuration of a base station, a terminal may transform NACK only-based HARQ-ACK into ACK/NACK-based HARQ-ACK only when NACK only-based HARQ-ACK is a HP or ACK/NACK-based HARQ-ACK is a LP, and otherwise, a terminal may follow other examples of the present disclosure or drop NACK only-based HARQ-ACK.

A terminal may transform NACK only-based HARQ-ACK into ACK/NACK-based HARQ-ACK only when NACK only-based HARQ-ACK is a LP or ACK/NACK-based HARQ-ACK is a HP, and otherwise, a terminal may apply another method of the present disclosure or drop ACK/NACK-based HARQ-ACK.

Embodiment 1B

A terminal may select one of NACK only-based HARQ-ACK or ACK/NACK-based HARQ-ACK according to a configuration of a base station and may drop ACK/NACK-based HARQ-ACK or NACK only-based HARQ-ACK which is not selected. In particular, a terminal that may not transmit at least two PUCCHs simultaneously may be configured to drop one of two HARQ-ACKs.

Embodiment 1B-1

A base station may indicate whether to select NACK only-based HARQ-ACK or ACK/NACK-based HARQ-ACK through DCI that scheduled corresponding PDSCH transmission, through a MAC CE or through a RRC message. Unselected NACK only-based HARQ-ACK or ACK/NACK-based HARQ-ACK may be dropped.

When receiving a plurality of DCIs indicating colliding HARQ-ACKs, a terminal selects ACK/NACK-based HARQ-ACK and drops NACK only-based HARQ-ACK if DCI received last indicates ACK/NACK-based HARQ-ACK. If DCI received last indicates NACK only-based HARQ-ACK, a terminal selects NACK only-based HARQ-ACK and drops ACK/NACK-based HARQ-ACK.

If DCI received last indicates ACK/NACK-based HARQ-ACK, a terminal may select ACK/NACK-based HARQ-ACK and transform NACK only-based HARQ-ACK into ACK/NACK-based HARQ-ACK to multiplex it with colliding ACK/NACK-based HARQ-ACK as in Method 1A. For example, when at least one ACK/NACK-based HARQ-ACK information and at least one transformed HARQ-ACK information (i.e., a result of transforming NACK only-based HARQ-ACK into ACK/NACK-based HARQ-ACK in order to multiplex it with another HARQ-ACK) are multiplexed in one PUCCH, a PUCCH resource may be determined based on a DCI format associated with ACK/NACK-based HARQ-ACK information. Here, a DCI format associated with ACK/NACK-based HARQ-ACK information may correspond to a DCI format received last in a terminal.

A MAC CE or a RRC messag may indicate whether a corresponding terminal will select NACK only-based HARQ-ACK or ACK/NACK-based HARQ-ACK per specific unit. For example, a specific unit may include at least one of a CFR that a multicast PDSCH is transmitted, a DL BWP that a unicast PDSCH is transmitted, an UL BWP that HARQ-ACK is transmitted, a G-RNTI and a G-RNTI group.

Embodiment 1B-2

It may be defined to priotize NACK only-based HARQ-ACK when NACK only-based HARQ-ACK is a HP and priotize ACK/NACK-based HARQ-ACK when NACK only-based HARQ-ACK is a LP. To this end, DCI including a PRI may indicate NACK only-based HARQ-ACK as a HP or a LP or a PUCCH resource of NACK only-based HARQ-ACK may be configured as a HP or a LP by a MAC CE or a RRC message.

Embodiment 1C

NACK only-based HARQ-ACK and ACK/NACK-based HARQ-ACK may be transmitted to a different PUCCH. For example, a terminal that may simultaneously transmit at least two PUCCHs by a TDM method in the same cell/BWP or by a FDM method in a different cell/BWP may transmit NACK only-based HARQ-ACK and ACK/NACK-based HARQ-ACK within the same slot through a different PUCCH. Here, a PUCCH resource transmitting NACK only-based HARQ-ACK may be determined based on DCI scheduling a PDSCH for NACK only-based HARQ-ACK and a PUCCH configuration for NACK only-based HARQ-ACK.

According to a configuration of a base station, a terminal may transmit a different PUCCH only when NACK only-based HARQ-ACK is a HP or ACK/NACK-based HARQ-ACK is a LP, and otherwise, a terminal may follow another example of the present disclosure or transmit only one PUCCH by dropping NACK only-based HARQ-ACK.

A terminal may transmit a different PUCCH only when NACK only-based HARQ-ACK is a LP or ACK/NACK-based HARQ-ACK is a HP, and otherwise, a terminal may follow another example of the present disclosure or transmit only one PUCCH by dropping ACK/NACK-based HARQ-ACK.

Embodiment 2

This embodiment relates to NACK only-based HARQ-ACK and ACK/NACK-based HARQ-ACK transmission with a different priority.

When NACK only-based HARQ-ACK and ACK/NACK-based HARQ-ACK transmission with a different priority are overlapped or should be transmitted to the same slot, a priority-based HARQ-ACK codebook configuration method of a terminal is described.

Embodiment 2A

NACK only-based HARQ-ACK may be transformed into ACK/NACK-based HARQ-ACK and may be multiplexed with another ACK/NACK-based HARQ-ACK. In transforming NACK only-based HARQ-ACK which is transmitted only in case of NACK into ACK/NACK-based HARQ-ACK which is transmitted both in case of ACK and NACK, multiplexing it with another HARQ-ACK and transmitting it, a different sub-codebook may be configured per priority. Afterwards, one PUCCH may be transmitted by configuring one HARQ-ACK codebook in a separate coding method of different sub-codebooks. A terminal may multiplex HARQ-ACK transformed from NACK only-based to ACK/NACK-based with a PUCCH resource of ACK/NACK-based HARQ-ACK. In particular, a terminal that may not transmit at least two PUCCHs simultaneously may be configured in this way.

According to a configuration of a base station, a terminal may transform NACK only-based HARQ-ACK into ACK/NACK-based HARQ-ACK only when NACK only-based HARQ-ACK is a HP and ACK/NACK-based HARQ-ACK is a LP, and otherwise, a terminal may follow other examples of the present disclosure or drop NACK only-based HARQ-ACK. Alternatively, a terminal may transform NACK only-based HARQ-ACK into ACK/NACK-based HARQ-ACK only when NACK only-based HARQ-ACK is a LP and ACK/NACK-based HARQ-ACK is a HP, and otherwise, a terminal may follow other examples of the present disclosure or drop ACK/NACK-based HARQ-ACK.

Embodiment 2B

A terminal may select HP HARQ-ACK and drop LP HARQ-ACK according to a configuration of a base station. In particular, a terminal that may not transmit at least two PUCCHs simultaneously may be configured to drop LP HARQ-ACK of two.

Here, HP or LP HARQ-ACK may be determined by a PUCCH resource transmitting it. In other words, a terminal may be configured to transmit a HP PUCCH resource and drop a LP PUCCH resource. For example, when a base station indicates a PRI and a HP or a LP with DCI, a terminal selects a PUCCH resource of a PUCCH resource ID indicated by a PRI in an indicated HP or LP PUCCH configuration. In this case, a selected PUCCH resource corresponds to a HP or LP PUCCH resource that transmits indicated HP or LP HARQ-ACK.

When a priority for NACK only-based HARQ-ACK is not designated, NACK only-based HARQ-ACK is dropped if ACK/NACK-based HARQ-ACK is a HP and ACK/NACK-based HARQ-ACK is dropped if ACK/NACK-based HARQ-ACK is a LP. Afterwards, only undropped HARQ-ACK is transmitted.

When a priority for ACK/NACK-based HARQ-ACK is not designated, NACK only-based HARQ-ACK is dropped if NACK only-based HARQ-ACK is a LP and ACK/NACK-based HARQ-ACK is dropped if NACK only-based HARQ-ACK is a HP. Afterwards, only HARQ-ACK that was not dropped is transmitted.

When both a priority for ACK/NACK-based HARQ-ACK and a priority for NACK only-based HARQ-ACK are not designated, a terminal may drop HARQ-ACK according to Embodiment 1B above.

Embodiment 2C

A terminal may transmit NACK only-based HARQ-ACK and ACK/NACK-based HARQ-ACK to a different PUCCH. For example, a terminal that may simultaneously transmit at least two PUCCHs by TDM in the same cell/BWP or by FDM in a different cell/BWP may transmit NACK only-based HARQ-ACK and ACK/NACK-based HARQ-ACK within the same slot through a different PUCCH. Here, a PUCCH resource transmitting NACK only-based HARQ-ACK may be determined based on DCI scheduling a PDSCH for NACK only-based HARQ-ACK and a PUCCH configuration for NACK only-based HARQ-ACK.

According to a configuration of a base station, a terminal may transmit a different PUCCH only when NACK only-based HARQ-ACK is a HP and ACK/NACK-based HARQ-ACK is a LP, and otherwise, a terminal may follow other examples of the present disclosure or transmit only one PUCCH by dropping NACK only-based HARQ-ACK. Alternatively, a terminal may transmit a different PUCCH only when NACK only-based HARQ-ACK is a LP and ACK/NACK-based HARQ-ACK is a HP, and otherwise, a terminal may follow other examples of the present disclosure or transmit only one PUCCH by dropping ACK/NACK-based HARQ-ACK.

Embodiment 3

This embodiment relates to NACK only-based HARQ-ACK transmission and a plurality of ACK/NACK-based HARQ-ACK transmission with a different priority.

When NACK only-based HARQ-ACK transmission and a plurality of ACK/NACK-based HARQ-ACK transmission with a different priority are overlapped or should be transmitted to the same slot, a priority-based HARQ-ACK codebook configuration method of a terminal is described.

Embodiment 3A

A terminal may transform NACK only-based HARQ-ACK into ACK/NACK-based HARQ-ACK and multiplex it with other ACK/NACK-based HARQ-ACKs. In other words, NACK only-based HARQ-ACK which is transmitted only in case of NACK may be transformed into ACK/NACK-based HARQ-ACK which is transmitted both in case of ACK and NACK and may be multiplexed with another HARQ-ACK to configure a different sub-codebook per priority or per cast type (e.g., unicast, multicast, broadcast, etc.). Different sub-codebooks may be transmitted through one PUCCH by configuring one HARQ-ACK codebook in a separate coding method. A terminal may multiplex HARQ-ACK transformed from NACK only-based to ACK/NACK-based with a PUCCH resource of ACK/NACK-based HARQ-ACK. In particular, a terminal that may not transmit at least two PUCCHs simultaneously may be configured in this way.

According to a configuration of a base station, a terminal may transform NACK only-based HARQ-ACK into ACK/NACK-based HARQ-ACK when NACK only-based HARQ-ACK is a HP, and otherwise, a terminal may follow other examples of the present disclosure or drop NACK only-based HARQ-ACK.

A terminal may transform NACK only-based HARQ-ACK into ACK/NACK-based HARQ-ACK when NACK only-based HARQ-ACK is a LP, and otherwise, a terminal may follow other examples of the present disclosure or drop ACK/NACK-based HARQ-ACK.

Embodiment 3B

A terminal may select HP HARQ-ACK(s) and drop LP HARQ-ACK(s) according to a configuration of a base station. In particular, a terminal that may not transmit at least two PUCCHs simultaneously may be configured to drop LP HARQ-ACK of two.

When a priority for NACK only-based HARQ-ACK is not designated, LP ACK/NACK-based HARQ-ACK(s) and NACK only-based HARQ-ACK are dropped and only undropped HARQ-ACK is transmitted.

When a priority for ACK/NACK based HARQ-ACK is not designated, NACK only-based HARQ-ACK is dropped if NACK only-based HARQ-ACK is a LP and ACK/NACK-based HARQ-ACKs are dropped if NACK only-based HARQ-ACK is a HP. Afterwards, only undropped HARQ-ACK is transmitted.

When both a priority for ACK/NACK-based HARQ-ACK and a priority for NACK only-based HARQ-ACK are not designated, a terminal may drop HARQ-ACK according to Embodiment 1B above.

Embodiment 3C

A terminal may transmit NACK only-based HARQ-ACK and ACK/NACK-based HARQ-ACK to a different PUCCH. For example, a terminal that may simultaneously transmit at least two PUCCHs by TDM in the same cell/BWP or by FDM in a different cell/BWP may transmit NACK only-based HARQ-ACK and ACK/NACK-based HARQ-ACK within the same slot through a different PUCCH. A PUCCH resource transmitting NACK only-based HARQ-ACK may be determined based on DCI scheduling a PDSCH for NACK only-based HARQ-ACK and a PUCCH configuration for NACK only-based HARQ-ACK.

According to a configuration of a base station, a terminal may transmit a different PUCCH only when NACK only-based HARQ-ACK is a HP, and otherwise, a terminal may follow other examples of the present disclosure or transmit only one PUCCH by dropping NACK only-based HARQ-ACK.

A terminal may transmit a different PUCCH only when NACK only-based HARQ-ACK is a LP, and otherwise, a terminal may follow other examples of the present disclosure or transmit only one PUCCH by dropping ACK/NACK-based HARQ-ACK(s).

Embodiment 3D

A terminal may transmit LP HARQ-ACK(s) and HP HARQ-ACK(s) through the same or different PUCCH. For example, a terminal that may simultaneously transmit at least two PUCCHs by TDM in the same cell/BWP or by FDM in a different cell/BWP may transmit LP HARQ-ACK(s) and HP HARQ-ACK(s) within the same slot through a different PUCCH. Examples below include examples in which HARQ-ACK(s) are transmitted through one PUCCH or through a different PUCCH.

Embodiment 3D-1

When NACK only-based HARQ-ACK is a LP, it may be dropped according to other examples of the present disclosure or it may be multiplexed with LP ACK/NACK-based HARQ-ACK(s) to configure a sub-codebook for a LP. According to other examples of the present disclosure, ACK/NACK based HARQ-ACK(s) may be dropped and a sub-codebook for a LP may be configured with NACK only-based HARQ-ACK. A terminal may configure a sub-codebook for a HP by multiplexing HP ACK/NACK-based HARQ-ACK(s).

When NACK only-based HARQ-ACK is a HP, it may be dropped according to other examples of the present disclosure or it may be multiplexed with HP ACK/NACK-based HARQ-ACK(s) to configure a sub-codebook for a HP. According to other examples of the present disclosure, ACK/NACK based HARQ-ACK(s) may be dropped and a sub-codebook for a HP may be configured with NACK only-based HARQ-ACK. A terminal configures a sub-codebook for a LP by multiplexing LP ACK/NACK-based HARQ-ACK(s).

A terminal may transmit a PUCCH by configuring one HARQ-ACK codebook through separate coding of a sub-codebook for a LP and a sub-codebook for a HP.

Embodiment 3D-2

When NACK only-based HARQ-ACK is a LP, it may be dropped according to other examples of the present disclosure or it may be multiplexed with LP ACK/NACK-based HARQ-ACK(s) and transmitted through a PUCCH resource for a LP. According to other examples of the present disclosure, a terminal may drop ACK/NACK-based HARQ-ACK(s) and transmit NACK only-based HARQ-ACK through a PUCCH for a LP.

When NACK only-based HARQ-ACK is a HP, it may be dropped according to other examples of the present disclosure or it may be multiplexed with HP ACK/NACK-based HARQ-ACK(s) and transmitted through a PUCCH resource for a HP. Alternatively, according to other examples of the present disclosure, a terminal may drop ACK/NACK-based HARQ-ACK(s) and transmit NACK only-based HARQ-ACK through a PUCCH for a HP.

Embodiment 3E

Unicast HARQ-ACK(s) and multicast HARQ-ACK(s) may be transmitted to a different PUCCH. For example, a terminal that may simultaneously transmit at least two PUCCHs by TDM in the same cell/BWP or by FDM in a different cell/BWP may transmit unicast HARQ-ACK(s) and multicast HARQ-ACK(s) within the same slot through a different PUCCH.

NACK only-based HARQ-ACK may be dropped according to other examples of the present disclosure or may be multiplexed with ACK/NACK-based multicast HARQ-ACK(s) and transmitted through a PUCCH resource for multicast. Alternatively, according to other examples of the present disclosure, a terminal may drop ACK/NACK-based multicast HARQ-ACK(s) and transmit NACK only-based HARQ-ACK through a PUCCH for multicast.

Embodiment 3F

A terminal may transmit multicast HARQ-ACKs with a different priority, a different G-RNTI or G-RNTI group or a different CFR through a different PUCCH. For example, a terminal that may simultaneously transmit at least two PUCCHs by a TDM method in the same cell/BWP or by a FDM method in a different cell/BWP may transmit multicast HARQ-ACKs with a different priority, a different G-RNTI or G-RNTI group or a different CFR within the same slot through a different PUCCH.

NACK only-based HARQ-ACK may be dropped according to other examples of the present disclosure or may be multiplexed with ACK/NACK-based multicast HARQ-ACK(s) and transmitted through a PUCCH resource for multicast. According to other examples of the present disclosure, a terminal may drop ACK/NACK-based multicast HARQ-ACK(s) and transmit NACK only-based HARQ-ACK through a PUCCH for multicast.

Embodiment 4

This embodiment relates to a plurality of NACK only-based HARQ-ACK transmission with the same or different priority.

When a plurality of NACK only-based HARQ-ACK transmission with the same or different priority are overlapped or should be transmitted to the same slot, a priority-based HARQ-ACK codebook configuration method of a terminal is described.

Embodiment 4A

A terminal may transform all NACK only-based HARQ-ACKs into ACK/NACK-based HARQ-ACK and multiplex it. If necessary, transformed HARQ-ACK information may be multiplexed with other ACK/NACK-based HARQ-ACKs. In other words, a terminal may configure a different sub-codebook per priority by transforming all NACK only-based HARQ-ACKs into ACK/NACK-based HARQ-ACKs (by multiplexing it with another HARQ-ACK, if necessary). Afterwards, a terminal may configure one HARQ-ACK codebook and transmit it through one PUCCH through a separate coding method of different sub-codebooks. A terminal may multiplex HARQ-ACK transformed from NACK only-based to ACK/NACK-based with a PUCCH resource of ACK/NACK-based HARQ-ACK. In particular, a terminal that may not transmit at least two PUCCHs simultaneously may be configured in this way.

When a terminal multiplexes only HARQ-ACKs for the same priority, it may configure one HARQ-ACK codebook and transmit it through one PUCCH.

According to a configuration of a base station, a terminal may transform only HP NACK only-based HARQ-ACK into ACK/NACK-based HARQ-ACK and for LP NACK only-based HARQ-ACK, a terminal may follow other examples of the present disclosure or drop it.

When ACK/NACK-based HARQ-ACK and NACK only-based HARQ-ACK are transmitted to the same slot or are overlapped, if there is no priority configuration for NACK only-based HARQ-ACK or if there is no HP NACK only-based HARQ-ACK, other examples of the present disclosure are followed or only ACK/NACK-based HARQ-ACK is transmitted by dropping all NACK only-based HARQ-ACK.

Embodiment 4B

A terminal may select HP HARQ-ACK among overlapping NACK only-based HARQ-ACKs and drop LP HARQ-ACK according to a configuration of a base station. In particular, a terminal that may not transmit at least two PUCCHs simultaneously may be configured to drop LP HARQ-ACK of two.

Embodiment 4B-1

When NACK only-based HARQ-ACK and ACK/NACK-based HARQ-ACK coexist, a terminal may select HP HARQ-ACK among NACK only-based HARQ-ACKs. Separately, a terminal may multiplex only ACK/NACK-based HARQ-ACKs according to a conventional method or other examples of the present disclosure.

Embodiment 4B-1A

When selected NACK only-based HARQ-ACK is overlapped with ACK/NACK-based HARQ-ACKs, a terminal may select and transmit only NACK only-based HARQ-ACK or only ACK/NACK-based HARQ-ACKs according to other examples of the present disclosure.

Embodiment 4B-2

When selected NACK only-based HARQ-ACK is overlapped with ACK/NACK-based HARQ-ACK, a terminal may transform NACK only-based HARQ-ACK into ACK/NACK-based HARQ-ACK to configure a HARQ-ACK codebook according to Embodiment 4A.

Embodiment 4D-3

When selected NACK only-based HARQ-ACK is overlapped with ACK/NACK-based HARQ-ACKs, a terminal may transmit NACK only-based HARQ-ACK and ACK/NACK-based HARQ-ACK to a different PUCCH according to Embodiment 4C.

Embodiment 4B-2

When a priority for NACK only-based HARQ-ACK is not designated, a terminal may multiplex only ACK/NACK-based HARQ-ACKs according to a conventional method or other examples of the present disclosure. In addition, a terminal may drop NACK only-based HARQ-ACK when ACK/NACK-based HARQ-ACK is a HP. In addition, a terminal may drop ACK/NACK-based HARQ-ACK when ACK/NACK-based HARQ-ACK is a LP. A terminal may transmit only undropped HARQ-ACK.

Embodiment 4B-3

When a priority for ACK/NACK-based HARQ-ACK is not designated, a terminal may drop NACK only-based HARQ-ACK when NACK only-based HARQ-ACK is a LP and may drop ACK/NACK-based HARQ-ACK when NACK only-based HARQ-ACK is a HP. A terminal transmits only undropped HARQ-ACK.

Embodiment 4B-4

When both a priority for ACK/NACK-based HARQ-ACK and a priority for NACK only-based HARQ-ACK are not specified, a terminal may drop HARQ-ACK according to Embodiment 1B.

Embodiment 4C

A terminal may select NACK only-based HARQ-ACKs according to other examples of the present disclosure and multiplex ACK/NACK-based HARQ-ACKs according to a conventional method or other examples of the present disclosure. Afterwards, a terminal may transmit selected NACK only-based HARQ-ACK and multiplexed ACK/NACK-based HARQ-ACK through a different PUCCH.

For example, a terminal that may simultaneously transmit at least two PUCCHs by a TDM method in the same cell/BWP or by a FDM method in a different cell/BWP may transmit NACK only-based HARQ-ACK and ACK/NACK-based HARQ-ACK within the same slot through a different PUCCH. In this case, a PUCCH resource transmitting NACK only-based HARQ-ACK may be determined based on DCI scheduling a PDSCH for NACK only-based HARQ-ACK and a PUCCH configuration for NACK only-based HARQ-ACK.

According to a configuration of a base station, a terminal may transmit a different PUCCH only when selected NACK only-based HARQ-ACK is a HP and ACK/NACK-based HARQ-ACK is a LP, and otherwise, a terminal may follow other examples of the present disclosure or transmit only one PUCCH by dropping NACK only-based HARQ-ACK. A terminal may transmit a different PUCCH only when NACK only-based HARQ-ACK is a LP and ACK/NACK-based HARQ-ACK is a HP, and otherwise, a terminal may follow other examples of the present disclosure or transmit only one PUCCH by dropping ACK/NACK-based HARQ-ACK.

Embodiment 4D

A terminal may select and transmit only NACK-only-based HARQ-ACK indicated by DCI received last (i.e., received most recently) among NACK only-based HARQ-ACKs and drop the remaining NACK only-based HARQ-ACK.

A terminal may select and transmit only NACK only-based HARQ-ACK indicated by the earliest DCI (i.e., received first in the past) among DCI received after the most recently transmitted NACK only-based HARQ-ACK or the most recently transmitted NACK only-based PUCCH resource.

Embodiment 4D-1

When selected NACK only-based HARQ-ACK is overlapped with ACK/NACK-based HARQ-ACKs, a terminal may select and transmit NACK only-based HARQ-ACK or ACK/NACK-based HARQ-ACK according to other examples of the present disclosure.

Embodiment 4D-2

When selected NACK only-based HARQ-ACK is overlapped with ACK/NACK-based HARQ-ACKs, a terminal may transform NACK only-based HARQ-ACK into ACK/NACK-based HARQ-ACK to configure a HARQ-ACK codebook according to Embodiment 4A.

Embodiment 4D-3

When selected NACK only-based HARQ-ACK is overlapped with ACK/NACK-based HARQ-ACKs, a terminal may transmit NACK only-based HARQ-ACK and ACK/NACK-based HARQ-ACK through a different PUCCH according to Embodiment 4C.

Embodiment 4E

A HARQ-ACK transmission method for a case in which a plurality of PUCCH transmission for NACK only-based HARQ-ACK are overlapped or are transmitted to the same slot is as follows.

Embodiment 4E-A

A terminal may select and transmit NACK only-based HARQ-ACK of a PUCCH with the earliest start symbol or end symbol or select and transmit NACK only-based HARQ-ACK of a PUCCH with the latest start symbol or end symbol.

Embodiment 4E-B

A terminal may select PUCCH transmission with the largest payload size of a PUCCH and drop the remaining PUCCH transmission with a small payload size.

Embodiment 4E-C

A terminal may select a PUCCH resource that the lowest PRB or the highest PRB of a PUCCH resource is the smallest or the largest and drop the remaining PUCCH resources.

Embodiment 4E-D

A terminal may select a PUCCH resource that a PUCCH resource ID or a PRI for a PUCCH resource is the smallest or the largest and drop the remaining PUCCH resources.

When selected NACK only-based HARQ-ACK is overlapped with ACK/NACK-based HARQ-ACKs, a terminal may select and transmit NACK only-based HARQ-ACK or ACK/NACK-based HARQ-ACK according to other examples of the present disclosure.

When selected NACK only-based HARQ-ACK is overlapped with ACK/NACK-based HARQ-ACKs, a terminal may transform NACK only-based HARQ-ACK into ACK/NACK-based HARQ-ACK to configure a HARQ-ACK codebook according to Embodiment 4A.

When selected NACK only-based HARQ-ACK is overlapped with ACK/NACK-based HARQ-ACKs, a terminal may transmit NACK only-based HARQ-ACK and ACK/NACK-based HARQ-ACK through a different PUCCH according to Embodiment 4C.

Embodiment 4F

One of detailed examples of Embodiment 4 may be performed for NACK only-based HARQ-ACK and ACK/NACK-based HARQ-ACK of multicast HARQ-ACK. When a result thereof is overlapped with unicast HARQ-ACK(s), a terminal may multiplex and transmit it through one PUCCH, drop multicast HARQ-ACK or unicast HARQ-ACK or transmit multicast HARQ-ACK and unicast HARQ-ACK through a different PUCCH according to a conventional method or examples of the present disclosure.

Embodiment 4G

A terminal may select one PUCCH resource (according to other examples of the present disclosure) among a plurality of PUCCH resources for a plurality of (colliding) multiplexed NACK only-based HARQ-ACK transmission and based on a selected PUCCH resource, rotate a constellation point on a constellation to indicate a plurality of multiplexing states.

Embodiment 4G-1

One NACK for NACK only-based HARQ-ACK may be transmitted through a PUCCH based on CS index 0. Two NACKs for NACK only-based HARQ-ACK may be transmitted through a PUCCH based on CS index 3. Three NACKs for NACK only-based HARQ-ACK may be transmitted through a PUCCH based on CS index 6. At least four NACKs for NACK only-based HARQ-ACK may be transmitted through a PUCCH based on CS index 9.

When there is at least one ACK for a plurality of NACK only-based HARQ-ACKs, a terminal may not transmit a PUCCH.

Embodiment 4G-2

One NACK for NACK only-based HARQ-ACK may be transmitted through a PUCCH based on CS index 0. Two NACKs for NACK only-based HARQ-ACK may be transmitted through a PUCCH based on CS index 3. At least three NACKs for NACK only-based HARQ-ACK may be transmitted through a PUCCH based on CS index 6.

When there is at least one ACK for a plurality of NACK only-based HARQ-ACKs, it may be transmitted through a PUCCH based on CS index 9.

Embodiment 4G-3

One NACK for NACK only-based HARQ-ACK may be transmitted through a PUCCH based on CS index 0. At least two NACKs for NACK only-based HARQ-ACK may be transmitted through a PUCCH based on CS index 3. ACK for NACK only-based HARQ-ACK with the earliest (oldest) timing may be transmitted through a PUCCH based on CS index 6. ACK for NACK only based HARQ-ACK with the latest (most recent) timing or with the second earliest timing may be transmitted through a PUCCH based on CS index 9.

When there are at least a certain number of ACK (regardless of whether it is ACK for NACK only-based HARQ-ACK with the earliest or latest timing), a terminal may not transmit a PUCCH. The specific number may be configured by a base station to a terminal.

Table 6 shows examples of multiplexing NACK only based multicast HARQ-ACK and unicast HARQ-ACK in at least one PUCCH transmission on a terminal side.

TABLE 6

| | | Unicast LP or multicast LP | Unicast HP and LP |
|---|---|---|---|
| Multicast HP | Option 1: Transmit one PUCCH- Drop a unicast pr multicast HP<br>Option 2: Two PUCCHs<br>Different PUCCHs multiplexed by a TDM method for unicast and multicast | Option 1: Transmit one PUCCH<br>Drop a unicast/multicast LP<br>Option 2: Two PUCCHs<br>Different PUCCHs multiplexed by a TDM method for unicast and multicast<br>Different PUCCHs multiplexed by a TDM method for a LP and a HP | Option 1: Transmit one PUCCH<br>Drop a unicast HP/LP or a multicast HP<br>Option 2: Two PUCCHs<br>Different PUCCHs multiplexed by a TDM method for a unicast HP and a multicast HP<br>Different PUCCHs multiplexed by a TDM method for a LP and a HP |
| Multicast LP | Option 1: Transmit one PUCCH- Drop a multicast LP<br>Option 2: Two | Option 1: Transmit one PUCCH<br>Drop a unicast LP or a multicast LP | Option 1: Transmit one PUCCH<br>Drop a multicast LP<br>Option 2: Two PUCCHs |

TABLE 6-continued

| | | Unicast LP or multicast LP | Unicast HP and LP |
|---|---|---|---|
| | PUCCHs<br>Different PUCCHs multiplexed by a TDM method for unicast and multicast<br>Different PUCCHs multiplexed by a TDM method for a LP and a HP | Option 2: Two PUCCHs<br>Different PUCCHs multiplexed by a TDM method for unicast and multicast | Different PUCCHs multiplexed by a TDM method for a unicast HP and a multicast LP<br>Different PUCCHs multiplexed by a TDM method for a LP and a HP (e.g., for a multicast LP and a unicast HP) |
| Multicast HP and LP | Option 1: Transmit one PUCCH<br>Drop a unicast HP or a multicast HP<br>Option 2: Two PUCCHs<br>Different PUCCHs multiplexed by a TDM method for unicast and multicast<br>Different PUCCHs multiplexed by a TDM method for a LP and a HP | Option 1: Transmit one PUCCH<br>Drop a unicast LP or a multicast LP<br>Option 2: Two PUCCHs<br>Different PUCCHs multiplexed by a TDM method for unicast and multicast<br>Different PUCCHs multiplexed by a TDM method for a LP and a HP | Option 1: Transmit one PUCCH<br>Drop a unicast/multicast LP and drop a multicast HP or a unicast HP<br>Option 2: Two PUCCHs<br>Different PUCCHs multiplexed by a TDM method for a unicast HP and a multicast HP<br>Different PUCCHs multiplexed by a TDM method for a LP and a HP |

Embodiment 5

This embodiment relates to ACK/NACK-based multicast HARQ-ACK transmission and unicast HARQ-ACK transmission for PTP retransmission.

Embodiment 5A

HARQ-ACK for PTM transmission and HARQ-ACK for PTP retransmission may be transmitted by the same PUCCH configuration.

Embodiment 5A-1

When HARQ-ACK for PTM transmission is configured to be based on NACK only by a base station, a terminal may transmit NACK only-based HARQ-ACK for PTP retransmission as well as PTM transmission. NACK only-based HARQ-ACK for PTP retransmission may be also transmitted according to NACK only-based HARQ-ACK of the present disclosure.

Embodiment 5A-2

A base station may configure a terminal to determine a PUCCH resource of HARQ-ACK for PTM transmission and a PUCCH resource of HARQ-ACK for PTP retransmission by using the same PUCCH configuration.

For example, when PTM transmission is configured to determine a PUCCH resource based on a PUCCH configuration for multicast, a terminal may also determine a PUCCH resource by using the same PUCCH configuration for multicast for PTP retransmission.

For example, when PTM transmission is configured to determine a PUCCH resource based on a PUCCH configuration for unicast, a terminal may also determine a PUCCH resource by using the same PUCCH configuration for unicast for PTP retransmission.

Embodiment 5B

An embodiment in which HARQ-ACK for PTP retransmission is transmitted by a PUCCH configuration for unicast is described below.

Embodiment 5B-1

When HARQ-ACK for PTM transmission is configured to be based on NACK only by a base station, a terminal may transmit ACK/NACK-based HARQ-ACK for PTP retransmission. ACK/NACK-based HARQ-ACK for PTP retransmission may configure a terminal to classify it as multicast HARQ-ACK and configure a HARQ-ACK codebook or to classify it as unicast HARQ-ACK and configure a HARQ-ACK codebook.

Embodiment 5B-2

A base station may configure a terminal to determine a PUCCH resource of HARQ-ACK for PTP retransmission by using a PUCCH configuration for unicast.

For example, when PTM transmission is configured for a terminal to determine a PUCCH resource based on a PUCCH configuration for multicast, a terminal may determine a PUCCH resource by using a PUCCH configuration for unicast for PTP retransmission.

For example, when PTM transmission is configured for a terminal to determine a PUCCH resource based on a PUCCH configuration for unicast, a terminal may determine a PUCCH resource by using a PUCCH configuration for unicast for PTP retransmission.

When a priority of PTM transmission is different from that of PTP retransmission, a PUCCH resource may be determined by using a different PUCCH for unicast for PTM and PTP retransmission. For example, when PTM transmission is configured as a HP and PTP retransmission is configured as a LP, a terminal may transmit HARQ-ACK for PTM transmission through a PUCCH resource determined by using a PUCCH configuration for unicast for a HP and transmit HARQ-ACK for PTP retransmission through a PUCCH resource determined by using a PUCCH configuration for unicast for a LP.

Embodiment 6

This embodiment relates to a PUCCH resource determination.

In examples described above, when NACK only-based HARQ-ACK collides with ACK/NACK-based HARQ or when a plurality of NACK only-based HARQ-ACKs collide, NACK only-based HARQ-ACK may be transformed into ACK/NACK-based HARQ-ACK. Here, a terminal may determine a PUCCH resource for transmission of HARQ-ACK transformed from NACK only-based to ACK/NACK-based (hereinafter, "transformed NACK only-based HARQ-ACK").

Embodiment 6A

When transformed NACK only-based HARQ-ACK is multiplexed with ACK/NACK-based HARQ-ACK colliding with it, a terminal may determine a PUCCH resource by using a PUCCH configuration for unicast.

Embodiment 6A-1

When colliding ACK/NACK-based HARQ-ACK is unicast HARQ-ACK, a PUCCH resource that multiplexed information will be transmitted may be determined by using a PUCCH configuration for unicast.

Embodiment 6A-2

When colliding ACK/NACK-based HARQ-ACK is LP or HP unicast HARQ-ACKs, a PUCCH resource that multiplexed information will be transmitted may be determined by using a PUCCH configuration for unicast for a HP.

When there is no collision with HP unicast HARQ-ACK, a PUCCH resource that multiplexed information will be transmitted may be determined by using a PUCCH configuration for unicast for a LP.

Embodiment 6A-3

When colliding ACK/NACK-based HARQ-ACK is multicast HARQ-ACKs, if multicast HARQ-ACK according to a PUCCH configuration for multicast and multicast HARQ-ACK according to a PUCCH configuration for unicast are included, a PUCCH resource that multiplexed information will be transmitted may be determined by using a PUCCH configuration for unicast.

Embodiment 6A-4

When colliding ACK/NACK-based HARQ-ACK is multicast HARQ-ACKs, if multicast HARQ-ACK according to a PUCCH configuration for multicast and multicast HARQ-ACK according to a PUCCH configuration for unicast are included, a PUCCH resource that multiplexed information will be transmitted may be determined by using a PUCCH configuration for unicast.

Embodiment 6A-5

When colliding ACK/NACK-based HARQ-ACK is LP or HP multicast HARQ-ACKs, a PUCCH resource that multiplexed information will be transmitted may be determined by using a PUCCH configuration for a HP for multicast HARQ-ACK.

When there is no collision with HP multicast HARQ-ACK, a PUCCH resource that multiplexed information will be transmitted may be determined by using a PUCCH configuration for a LP for multicast HARQ-ACK. Here, a PUCCH configuration for multicast HARQ-ACK may be a PUCCH configuration for unicast or a PUCCH configuration for multicast according to a configuration of a base station.

Embodiment 6B

A terminal may preferentially select a PUCCH resource of ACK/NACK-based unicast HARQ-ACK that collided with transformed NACK only-based HARQ-ACK as a PUCCH resource that multiplexed information will be transmitted.

Only when transformed NACK only-based HARQ-ACK transmission collides with only multicast HARQ-ACK without colliding with unicast HARQ-ACK, transformed NACK only-based HARQ-ACK may be multiplexed or dropped on a PUCCH resource of colliding multicast HARQ-ACK. Detailed examples are as follows.

Embodiment 6B-1

A terminal preferentially multiplexes transformed NACK only-based HARQ-ACK on a PUCCH resource of colliding ACK/NACK-based multicast HARQ-ACK. Only when transformed NACK only-based HARQ-ACK transmission collides with only unicast HARQ-ACK without colliding with multicast HARQ-ACK, transformed NACK only-based HARQ-ACK may be multiplexed or dropped on a PUCCH resource of colliding unicast HARQ-ACK.

Embodiment 6B-2

A terminal may preferentially multiplex transformed NACK only-based HARQ-ACK on a PUCCH resource indicated by DCI which is CRC-scrambled by a C-RNTI among colliding ACK/NACK-based HARQ-ACKs.

When there are a plurality of C-RNTI DCIs indicating colliding ACK/NACK-based HARQ-ACKs, a terminal may preferentially select and multiplex a PUCCH resource indicated by the last received C-RNTI DCI. When DCI for PTP retransmission among C-RNTI DCIs is included, a PUCCH resource indicated by the remaining C-RNTI DCI excluding it may be preferentially selected and multiplexed.

Embodiment 6B-3

It is assumed that a terminal receives a plurality of DCIs indicating HARQ-ACKs for ACK/NACK-based HARQ-ACKs that collided with transformed NACK only-based HARQ-ACK. When the last received DCI indicates ACK/NACK-based HARQ-ACK, a terminal may select ACK/NACK-based HARQ-ACK. When the last received DCI indicates NACK only based HARQ-ACK, a terminal may select NACK only based HARQ-ACK. A terminal may transmit selected NACK only-based HARQ-ACK or selected ACK/NACK-based HARQ-ACK on a PUCCH resource indicated by the last received DCI.

Embodiment 6B-4

Among ACK/NACK-based HARQ-ACKs that collided with transformed NACK only-based HARQ-ACK, a terminal may preferentially select and multiplex a HP PUCCH resource. For example, when among DCIs for all colliding HARQ-ACKs, any DCI indicates a HP and a PUCCH resource, a terminal may multiplex colliding HARQ-ACKs on a corresponding PUCCH resource.

Embodiment 6B-5

Among colliding NACK only-based HARQ-ACK and ACK/NACK-based HARQ-ACK, a terminal may preferentially select and multiplex a PUCCH resource of NACK only-based HARQ-ACK which intends to transmit NACK. Among colliding NACK only-based HARQ-ACK and ACK/NACK-based HARQ-ACK, other HARQ-ACKs that intend to transmit NACK may be multiplexed on a PUCCH resource of NACK only-based HARQ-ACKs.

For example, when NACK is indicated for both conflicting NACK only-based HARQ-ACK and ACK/NACK-based HARQ-ACK, a PUCCH resource of NACK only-based HARQ-ACK may be preferentially selected to multiplex other HARQ-ACKs. In other words, since ACK is not actually transmitted in NACK only-based HARQ-ACK, only a PUCCH resource for transmission of another HARQ-ACK multiplexed with it may be determined based on NACK only-based HARQ-ACK.

Embodiment 6C

In transforming colliding NACK only-based HARQ-ACKs into ACK/NACK-based HARQ-ACK, it may be assumed that only transformed NACK only-based HARQ-ACKs are multiplexed (i.e., NACK only-based HARQ-ACKs collide with only NACK only-based HARQ-ACK without colliding with ACK/NACK-based HARQ-ACK). Alternatively, when constellation points are rotated on a constellation for a plurality of colliding NACK only-based HARQ-ACKs or when it is transmitted by only one PUCCH resource among a plurality of colliding NACK only-based HARQ-ACKs, a PUCCH resource may be determined as follows.

Embodiment 6C-1

Among PUCCH resources for colliding NACK only-based HARQ-ACKs, other HARQ-ACKs may be multiplexed on a PUCCH resource corresponding to the lowest PUCCH resource ID. When DCI indicates a PRI, a terminal may preferentially select and transmit a PUCCH resource indicated by the lowest PRI, transmit it by multiplexing other HARQ-ACKs or transmit it by rotating a constellation point by including other HARQ-ACKs.

Embodiment 6C-2

A terminal may preferentially select and transmit a PUCCH resource indicated by a PRI of the last received DCI among DCIs for colliding NACK only-based HARQ-ACKs, transmit it by multiplexing other HARQ-ACKs or transmit it by rotating a constellation point by including other HARQ-ACKs.

Embodiment 6C-3

A terminal may preferentially select and transmit a PUCCH resource using a PUCCH configuration for unicast among PUCCH resources for colliding NACK only-based HARQ-ACKs, transmit it by multiplexing other HARQ-ACKs or transmit it by rotating a constellation point by including other HARQ-ACKs.

For example, when a PUCCH resource for NACK only-based HARQ-ACK may be applied to a PUCCH configuration for unicast, it may be selected in preference to a PUCCH resource for NACK only-based HARQ-ACK determined based on a PUCCH configuration for multicast.

Embodiment 6C-4

Multiplexing may be performed with other HARQ-ACKs on a PUCCH resource with a high priority among PUCCH resources for colliding NACK only-based HARQ-ACKs. For example, when DCI for colliding NACK only-based HARQ-ACKs indicates a priority, a terminal may multiplex other HARQ-ACKs with a PUCCH resource for NACK only-based HARQ-ACK indicated as a HP. A terminal may select and transmit a PUCCH resources in a PUCCH configuration for a HP in preference to a PUCCH resource in a PUCCH configuration for a LP, transmit it by multiplexing other HARQ-ACKs or transmit it by rotating a constellation point by including other HARQ-ACKs.

Embodiment 6C-5

Other NACK only-based HARQ-ACKs may be multiplexed on a PUCCH resource indicated by a PRI of DCI which is CRC-scrambled by a C-RNTI among DCIs for colliding NACK only-based HARQ-ACKs. When there are a plurality of C-RNTI DCIs indicating colliding NACK only-based HARQ-ACKs, a terminal may preferentially select and multiplex a PUCCH resource indicated by the last received C-RNTI DCI. when DCI for PTP retransmission among C-RNTI DCIs is included, a terminal may preferentially select and transmit a PUCCH resource indicated by the remaining C-RNTI DCIs excluding it, transmit it by multiplexing other HARQ-ACKs or transmit it by rotating a constellation point by including other HARQ-ACKs.

Embodiment 6C-6

A terminal may transmit HARQ-ACK of a PUCCH resource indicated by a PRI in preference to HARQ-ACK of a PUCCH resource not indicated by a PRI.

Embodiment 6C-7

A terminal may preferentially select and transmit a PUCCH resource that intends to transmit NACK among colliding NACK only-based HARQ-ACKs, transmit it by multiplexing other HARQ-ACKs or transmit it by rotating a constellation point by including other HARQ-ACKs.

For example, when one NACK and one ACK are indicated for two colliding NACK only-based HARQ-ACKs, a terminal may multiplex other HARQ-ACKs on a PUCCH resource corresponding to NACK. In other words, since ACK is not transmitted in NACK only-based HARQ-ACK, only a PUCCH resource corresponding to NACK may be transmitted.

Embodiment 6C-8

When a plurality of PUCCHs for M colliding NACK only-based HARQ-ACKs may be transmitted, NACK only-based HARQ-ACKs may be transmitted on a plurality of PUCCH resources. A plurality of PUCCH resources may be determined as follows.

Embodiment 6C-8-1

When a terminal has an ability to simultaneously transmit up to N among M (M>N), NACK only-based HARQ-ACK may be transmitted on PUCCH resources corresponding to N lowest or highest PUCCH resource IDs among M PUCCH resource ID values. Here, M HARQ-ACK information may be multiplexed according to other examples described above or only N HARQ-ACKs may be selected and transmitted through N PUCCHs.

Embodiment 6C-8-2

When a terminal has an ability to simultaneously transmit up to N among M (M>N), NACK only-based HARQ-ACK may be transmitted on a PUCCH resource indicated by N lowest or highest DCIs among G-RNTI values of a PDCCH/a PDSCH for M colliding NACK only-based HARQ-ACKs. Here, M HARQ-ACK information may be multiplexed according to other examples described above or only N HARQ-ACKs may be selected and transmitted through N PUCCHs.

Embodiment 6D

A terminal may select and transmit only one of PUCCH resources for colliding NACK only-based HARQ-ACKs. Here, one PUCCH resource may be determined as follows.

For example, only NACK may be transmitted through one PUCCH corresponding to the lowest or highest PUCCH ID or PRI.

For example, only NACK through one PUCCH indicated by a PRI of last or first DCI may be transmitted.

For example, only NACK through one PUCCH determined based on a unicast PUCCH configuration may be transmitted.

For example, only NACK through one PUCCH with a high priority may be transmitted.

For example, only NACK through one PUCCH indicated by a PRI of C-RNTI DCI may be transmitted.

For example, when even one colliding ACK/NACK HARQ-ACK is NACK, only NACK through a PUCCH corresponding to it may be transmitted.

For example, when two PUCCH transmissions are possible, NACK for PDSCHs scheduled by a different G-RNTI through a different PUCCH may be transmitted. Here, only N PUCCHs may be transmitted in descending order of PUCCH ID values. Alternatively, only N PUCCHs may be transmitted to each PUCCH resource indicated by N in descending order of G-RNTI values.

Figure 10:
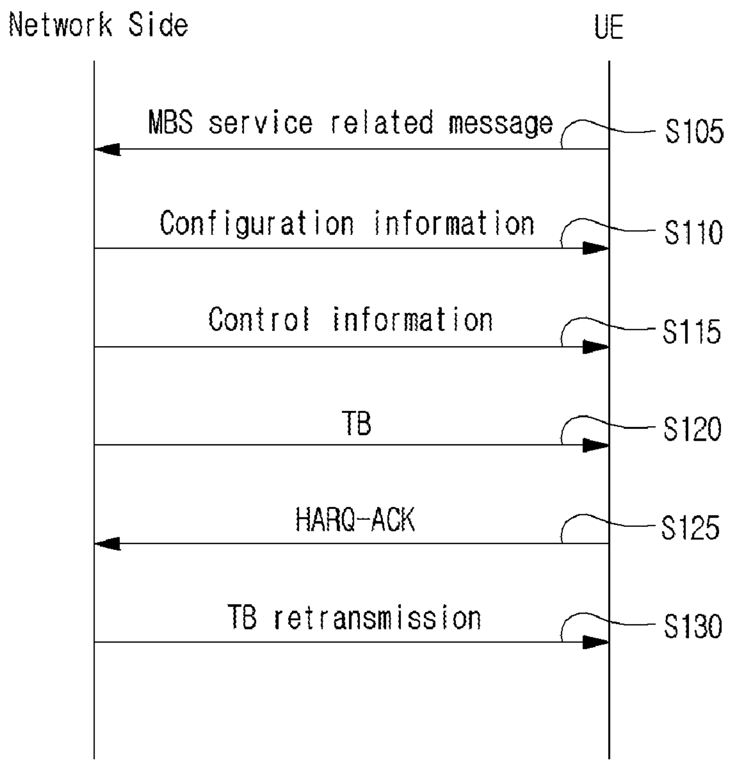
FIG. 10 is a diagram for illustrating a signaling process of a network side and a terminal according to an embodiment of the present disclosure.

FIG. 10 is a diagram for illustrating a signaling procedure of the network side and the terminal according to an embodiment of the present disclosure.

FIG. 10 shows an example of signaling between a network side and a terminal (UE) in a situation to which the examples (e.g., embodiments 1, 2, 3, 4, 5, 6, 7 or its detailed examples, and a combination of one or more thereof) of the present disclosure described above may be applied.

Here, the UE/network side is exemplary, and may be replaced with various devices to be described with reference to FIG. 11. FIG. 10 is for convenience of description, and does not limit the scope of the present disclosure. Also, some step(s) shown in FIG. 10 may be omitted depending on circumstances and/or settings. In addition, in the operation of the network side/UE of FIG. 10, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like.

In addition, the TP and/or TRP may include a panel, a transmission and reception unit, and the like of the base station.

The UE may enter the RRC_CONNECTED mode, and may report a message indicating one or more interested MBS services to the network side (S105).

Here, the UE may transmit the message to the network side through at least one of UCI, MAC CE (Control Element), or RRC message. In addition, the MBS service of interest in the message may mean one of TMGI and G-RNTI listed in a DL message received from the network side.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

For example, the operation of the UE (100 or 200 in FIG. 11) of the above-described step S105 transmitting the message to the network side (200 or 100 in FIG. 11) may be implemented by the device of FIG. 11 to be described below. For example, referring to FIG. 11, the one or more processors 102 may control one or more transceivers 106 and/or one or more memories 104, etc. to transmit the message, and the one or more transceivers 106 may transmit the message to the network side.

Upon receiving the message, the network side may transmit configuration information to the UE by an RRC message (S110).

For example, the configuration information may include CFR (common frequency resource) configuration information, one or more group common PDSCH configuration information including TCI states for one or more G-RNTI values, search space configuration information including TCI states for one or more G-RNTI values.

Here, the RRC message may be a group common message transmitted through a PTM MCCH (Multicast Control Channel) or a UE-dedicated message transmitted through a UE-specific DCCH (Dedicated Control Channel).

In addition, CFR may include DL CFR and UL CFR. For example, one DL CFR may provide group common PDCCH and group common PDSCH transmission resources for MBS transmission or reception. One UL CFR may provide HARQ-ACK PUCCH resources for group common PDSCH reception. One CFR may be one MBS-specific BWP or one UE-specific BWP. Additionally or alternatively, one or a plurality of CFRs may be configured in one UE-specific BWP. One CFR may have a linkage relationship with one UE-specific BWP.

The terminal may be configured with at least a G-RNTI value for each MBS CFR or each serving cell. GC-CS-RNTI may be configured/used for activation, retransmission or release of one or more group common SPS configurations.

When the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

In addition, configuration information of each PDSCH (e.g., 'PDSCH-config') may be configured as shown in Table 7 as a minimum information element for multicast and/or broadcast.

TABLE 7

```
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease { DMRS-DownlinkConfig }
OPTIONAL, -- Need M
dmrs-DownlinkForPDSCH-MappingTypeB SetupRelease { DMRS-DownlinkConfig }
OPTIONAL, -- Need M
tci-StatesToAddModList SEQUENCE (SIZE(1..maxNrofTCI-States)) OF TCI-State
OPTIONAL, -- Need N
tci-StatesToReleaseList SEQUENCE (SIZE(1..maxNrofTCI-States)) OF TCI-StateId
OPTIONAL, -- Need N
vrb-ToPRB-Interleaver ENUMERATED {n2, n4} OPTIONAL, -- Need S
resourceAllocation ENUMERATED { resourceAllocationType0, resourceAllocationType1,
dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList SEQUENCE (SIZE (1..maxNrofRateMatchPatterns)) OF
RateMatchPattern OPTIONAL, -- Need N
rateMatchPatternToReleaseList SEQUENCE (SIZE (1..maxNrofRateMatchPatterns)) OF
RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
... }
```

For example, the operation of the UE (100 or 200 in FIG. 11) of the above-described step S110 receiving configuration information from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the configuration information, and the one or more transceivers 106 may receive the configuration information from the network side.

The UE may receive control information from the network side (S115). For example, the UE may receive downlink control information (DCI) for scheduling/activating/releasing uplink/downlink transmission from the network side.

Specifically, when the search space is configured for the configured CFR, the UE may monitor the PDCCH in the SS (search space) configured in the configured CFR, to receive DCI CRC scrambled with G-RNTI or G (group)-CS (configured scheduling)-RNTI.

For example, the operation of the UE (100 or 200 in FIG. 11) of the above-described step S115 receiving control information from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the control information, and the one or more transceivers 106 may receive the control information from the network side.

The UE may receive the TB from the network side (S120).

Specifically, when the data unit is available on the MTCH of the MBS radio bearer (MRB) for the MBS service, the network side may construct and transmit a TB including the data unit for an SPS PDSCH occasion associated with the MTCH of the MRB for the MBS service, or associated with TMGI of the MBS service, or associated with a short ID of the MBS service, or associated with G-RNTI mapped to the MBS service, according to the service-to-resource mapping.

For group common dynamic scheduling of the TB, the network side may transmit DCI through PDCCH to the UE. The corresponding DCI may be CRC scrambled by G-RNTI, G-CS-RNTI, or CS-RNTI. The PDCCH may be implemented as a group common PDCCH or a UE-specific PDCCH.

For example, the DCI may include at least one of an identifier for the DCI format, a carrier indicator, a bandwidth part indicator, frequency domain resource assignment, time domain resource assignment, VRB-to-PRB mapping, PRB bundling size indicator, rate matching indicator, ZP CSI-RS trigger, MCS, NDI, RV, HARQ process number, downlink assignment index, TPC command for scheduled PUCCH, PUCCH resource indicator, PDSCH-to-HARQ_feedback timing indicator, an antenna port, a transmission configuration indication, an SRS request, a DMRS sequence initialization, or a priority indicator.

For group common dynamic scheduling, by group common or UE-specific RRC message or by group common or UE-specific MAC CE, the network side may provide with UE one or more of the service-resource mappings for the MBS service identified by TMGI or G-RNTI or GC-CS-RNTI. Data of the MBS service may be carried through MBS radio bearer (MRB) of a multicast traffic logical channel, that is, MTCH associated to the MBS service. RRC message may be a group common message transmitted through PTM MCCH (Multicast Control Channel) or UE-dedicated message transmitted through UE-specific DCCH (Dedicated Control Channel). The DCI scheduling PDSCH carrying the MBS service data may additionally indicate at least one of short ID, MTCH ID, MRB ID, G-RNTI value, and a TMGI value for the MBS service.

When receiving DCI CRC scrambled by G-RNTI that the UE is interested to receive, the UE may determine MBS service(s) associated with one or more of short ID, MTCH ID, MRB ID, G-RNTI value, and a TMGI value for each PDSCH occasion, based on mapping between MBS service and HPN indicated in the DCI, and/or mapping between MBS service and short ID(s) indicated in the DCI.

Then, when UE is interested in the determined MBS service(s), the UE may receive PDSCH transmission scheduled by the DCI. When the UE is not interested in the determined MBS service(s), UE may not receive PDSCH transmission scheduled by the DCI.

For example, the operation of the UE (100 or 200 in FIG. 11) of the above-described step S120 receiving the TB from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the TB, and the one or more transceivers 106 may receive the TB from the network side.

Upon receiving group common DCI indicating PUCCH resource(s) for MBS HARQ-ACK, the UE may transmit HARQ-ACK through PUCCH after a PDSCH reception scheduled by the DCI (S125). That is, according to decoding status of PDSCH transmission, the UE may transmit HARQ feedback to the network side.

In the case of PTM scheme 1, group common DCI may indicate a single PUCCH resource indicator and a single PDSCH-to-HARQ_feedback timing indicator at least for ACK/NACK based HARQ-ACK.

Specifically, in the case of UE-specific PUCCH resource allocation for ACK/NACK based HARQ-ACK for group common DCI, different UEs in the corresponding group (unless 'PUCCH-config' for multicast is configured) may be configured with different values of at least 'PUCCH-Resource' and 'd1-DataToUL-ACK' in UE-dedicated 'PUCCH-config' for multicast or for unicast. Different UEs may be allocated with different PUCCH resources, by the same PUCCH resource indicator and the same 'PDSCH-to-HARQ_feedback timing indicator of the group common DCI.

In the case of PTP retransmission, the PUCCH resource indicator and the PDSCH-to-HARQ_feedback timing indicator in the UE-specific DCI may be interpreted based on 'PUCCH-config' for unicast, regardless of whether 'PUCCH-config' for multicast is configured or not.

Here, PRI (PUCCH Resource Indicator) may be indicated by group common DCI as follows.

As an example, UE-specific PRI list may be included in the DCI (option 1A-1). Each PRI in the corresponding list may indicate an entry corresponding to a candidate 'pucch-ResourceId' value of 'PUCCH-config' for allocation of the same PUCCH resource or different PUCCH resources for different UEs in the group receiving the same DCI. Different PRI of DCI may indicate different entry in 'PUCCH-config.'

Here, a candidate 'pucch-ResourceId; value may be configured by RRC, and a different 'pucch-ResourceId' value may be configured for a different UE in the same group at least in multicast PUCCH-config.

As an additional example, a group common PRI may be included in the DCI (option 1-A-2). A single group common PRI may indicate a specific entry for a candidate 'pucch-ResourceId' value in UE-specific 'PUCCH-config' for allocation of the same or different PUCCH resources for all UEs in the group.

In addition, a candidate 'pucch-ResourceId' value may be configured by RRC. Different 'pucch-ResourceId' value may be configured for different UE in the same group at least in 'PUCCH-config' for multicast.

When 'PUCCH-config' for multicast is configured for HARQ-ACK for group common PDSCH scheduled by the group common DCI, the UE may assume that the PRI of the group common DCI indicates an entry corresponding to a candidate 'pucch-ResourceId' value in 'PUCCH-config' for multicast.

When 'PUCCH-config' for multicast is not configured for HARQ-ACK for group common PDSCH scheduled by the group common DCI, the UE may assume that the PRI of the group common DCI indicates an entry corresponding to a candidate 'pucch-ResourceId' value in 'PUCCH-config' for unicast.

K1 (PDSCH-to-HARQ_feedback timing indicator) may be indicated by group common DCI as follows.

As an example, UE-specific K1 value list may be included in the DCI (option 1B-1). Each K1 in the list may indicate the same UL slot or different UL (sub-) slot for different UE in the group.

For example, Different K1 values may be allocated to different UEs. That is, K1 may be allocated to UE1, K2 may be allocated to UE2, K3 may be allocated to UE3.

As an additional example, multiple UEs may share K1 value. For example, UE1 and UE2 may share K1 value, UE3 and UE4 may share K2 value.

As an additional example, one K1 value may be a reference, and other K1 value may be allocated based on the reference. {K1_ref, K1_offset list} may be indicated by DCI.

For example, UE1 may use K1_ref, UE2 may use K1_ref+K1_offset1, UE3 may use K1_ref+K1_offset2.

As an additional example, group common K1 value may be included in the DCI (option 1B-2). For example, a single K1 value may indicate an entry corresponding to a candidate 'd1-DataToUL-ACK' values in UE-specific 'PUCCH-config' for allocation of the same or different PUCCH resources for all UEs in the group receiving the DCI. This may be applied for the case that a DCI format is configured in UE-specific 'PUCCH-config' for the K1 value.

As an additional example, a candidate 'd1-DataToUL-ACK' value may be configured by RRC, and may be differently configured for different UE in the same group at least in 'PUCCH-config' for multicast.

As an additional example, when 'PUCCH-config' for multicast is configured for HARQ-ACK for group common PDSCH scheduled by group common DCI, UE may assume that K1 value of the group common DCI indicates an entry corresponding to a candidate 'd1-DataToUL-ACK' value in 'PUCCH-config' for multicast.

As an additional example, when 'PUCCH-config' for multicast is not configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for unicast.

In addition, when the UE receives group common DCI CRC scrambled by G-RNTI and/or UE-specific DCI CRC scrambled by C-RNTI, and when Type-1 HARQ-ACK codebook is configured for 'PUCCH-config' for multicast and/or 'PUCCH-config' for unicast, UE may construct TDRA (Time Domain Resource Allocation) to generate Type-1 HARQ-ACK codebook for HARQ-ACK(s) for group common PDSCH scheduled by group common DCI and/or UE-specific PDSCH scheduled by UE-specific DCI.

When TB decoding in a PDSCH transmission occasion is not successful, UE may transmit HARQ NACK to the network side through a PUCCH resource in the configured UL CFR.

Using PUCCH resource, the UE may transmit HARQ-ACK for other PDSCH transmissions such as unicast SPS PDSCH, dynamic unicast PDSCH, PTP retransmission and/or dynamic group common PDSCH.

Here, for multiplexing HARQ-ACKs on PUCCH in a (sub) slot for SPS PDSCH for multicast, SPS PDSCH for unicast, dynamically scheduled multicast PDSCH, and/or dynamically scheduled unicast PDSCH, UE may construct a codebook based on one or more of the above options.

When RSRP threshold is configured, the UE may use NACK only based HARQ-ACK based on the measured RSRP of a serving cell. When the measured RSRP is higher than a threshold, NACK only based HARQ-ACK may be transmitted through group common PUCCH resource indicated by PRI of DCI. When the measured RSRP is lower than the threshold, NACK only based HARQ-ACK may be transformed into ACK/NACK based HARQ-ACK on UE-specific PUCCH resource indicated by PRI of DCI.

Meanwhile, when the 'pdsch-AggregationFactor' is configured for a G-RNTI or when 'repetition_number' is indicated by the network side by DCI, the TB scheduled by group common DCI may be repeated for Nth HARQ transmission of the TB within each symbol allocation among each of the 'pdsch-AggregationFactor' consecutive slots or among each of the 'repetition_number' consecutive slots, if configured.

For example, the operation of the UE (100 or 200 in FIG. 11) of the above-described step S125 transmitting the HARQ-ACK to the network side (200 or 100 in FIG. 11) may be implemented by the device of FIG. 11 to be described below. For example, referring to FIG. 11, the one or more processors 102 may control one or more transceivers 106 and/or one or more memories 104, etc. to transmit the HARQ-ACK, and the one or more transceivers 106 may transmit the HARQ-ACK to the network side.

Receiving HARQ NACK of a TCI state, the network side may retransmit, using the TCI state, PDCCH and PDSCH in the DL CFR configured for retransmission of TB (S130).

UE may monitor group common and/or UE-specific PDCCH using the TCI state for a search space configured in DL CFR to receive a retransmission of the TB. The network side may retransmit the TB to one of the UEs in the group by UE-specific PDCCH. Meanwhile, other UE(s) may not receive the retransmission of the TB, as it has successfully received the TB.

When the UE receives the PDCCH for the retransmission of the TB, the UE may receive the PDSCH scheduled by the DCI of the PDCCH. When the UE successfully decodes the TB in the PDSCH, the UE may consider that the decoded TB is associated with MTCH, MRB, TMGI, G-RNTI and/or short ID of MBS service, based on mapping between MBS service and HPN (HARQ Process Number) indicated by the DCI, and/or mapping between MBS service and short ID(s) indicated by the DCI.

When TB decoding in PDSCH transmission occasion is successful, the UE may transmit HARQ ACK to the network side through PUCCH resource in UL CFR configured according to the above-described procedure. Using PUCCH resource, the UE may transmit HARQ-ACK for other PDSCH transmission such as unicast SPS PDSCH, dynamic unicast PDSCH, PTP retransmission and/or dynamic group common PDSCH.

In this case, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, the UE may construct a codebook based on one or more of the above-described options/embodiments.

For example, the operation of the UE (100 or 200 in FIG. 11) of the above-described step S130 receiving TB retransmission from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive TB retransmission, and the one or more transceivers 106 may receive TB retransmission from the network side.

General Device to which the Present Disclosure May be Applied

Figure 11:
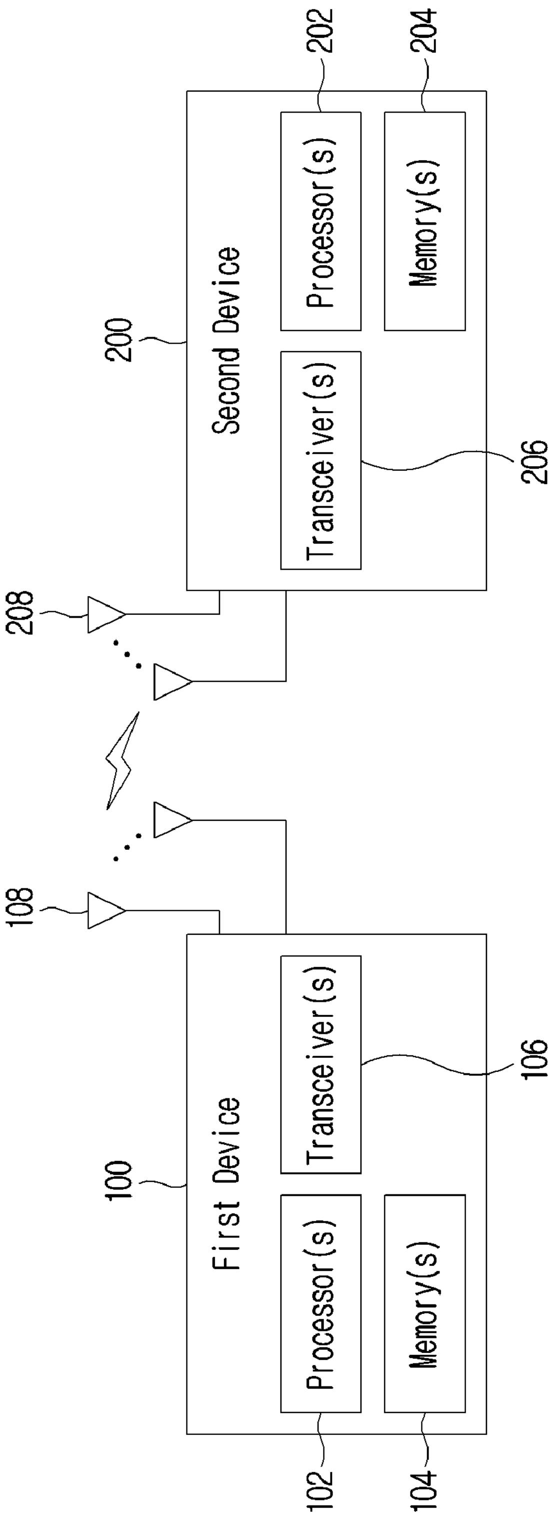
FIG. 11 illustrates a block diagram of a wireless communication device according to an embodiment of the present disclosure.

FIG. 11 is a diagram which illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods included in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a terminal from a network, a first multicast physical downlink shared channel (PDSCH) based on a first multicast downlink control information (DCI) format;

receiving, by the terminal from the network, a second multicast PDSCH based on a second multicast DCI format; and multiplexing, by the terminal, and transmitting to the network, through a physical uplink control channel (PUCCH) both of first multicast hybrid automatic repeat and request-acknowledgement (HARQ-ACK) information based on a first HARQ-ACK reporting mode and second multicast HARQ-ACK information based on a second HARQ-ACK reporting mode, wherein based on the second multicast DCI format being received after the first multicast DCI format, the PUCCH resource is determined by using the first multicast DCI format, wherein the first HARQ-ACK reporting mode includes generating HARQ-ACK information with an ACK value or with a non-acknowledgement (NACK) value based on whether a transport block is successfully decoded, and wherein the second HARQ-ACK information reporting mode includes not transmitting HARQ-ACK information including only an ACK value and transmitting HARQ-ACK information including a NACK value.

2. The method of claim 1, wherein:

the first HARQ-ACK information and the second HARQ-ACK information have a same priority.

3. The method of claim 1, wherein:

for multiplexing the second multicast HARQ-ACK information based on the second HARQ-ACK reporting mode with the first multicast HARQ-ACK information based on the first HARQ-ACK reporting mode, the terminal provides the second HARQ-ACK information based on the first HARQ-ACK reporting mode.

4. The method of claim 1, wherein:

the first multicast DCI format is a last DCI format among DCI formats associated with multicast HARQ-ACK information based on the first HARQ-ACK reporting mode.

5. The method of claim 1, wherein:

only multicast HARQ-ACK information are multiplexed in the PUCCH.

6. The method of claim 1, wherein:

the multicast DCI format is CRC (cyclic redundancy check)-scrambled by a group-radio network temporary identifier (G-RNTI) or a group-configured scheduling-RNTI (G-CS-RNTI).

7. A terminal comprising:

at least one transceiver; and at least one processor connected to the at least one transceiver, wherein the at least one processor is configured to:

receive, through the at least one transceiver, from a network, a first multicast physical downlink shared channel (PDSCH) based on a first multicast downlink control information (DCI) format;

receive, through the at least one transceiver, from the network, a second multicast PDSCH based on a second multicast DCI format; and multiplex and transmit to the network, through a physical uplink control channel (PUCCH) both of first multicast hybrid automatic repeat and request-acknowledgement (HARQ-ACK) information based on a first HARQ-ACK reporting mode and second multicast HARQ-ACK information based on a second HARQ-ACK reporting mode, wherein based on the second multicast DCI format being received after the first multicast DCI format, the PUCCH resource is determined by using the first multicast DCI format, wherein the first HARQ-ACK reporting mode includes generating HARQ-ACK information with an ACK value or with a non-acknowledgement (NACK) value based on whether a transport block is successfully decoded, and wherein the second HARQ-ACK information reporting mode includes not transmitting HARQ-ACK information including only an ACK value and transmitting HARQ-ACK information including a NACK value.

8. A base station comprising:

at least one transceiver; and at least one processor connected to the at least one transceiver, wherein the at least one processor is configured to:

transmit, through the at least one transceiver, to at least one terminal, a first multicast physical downlink shared channel (PDSCH) based on a first multicast downlink control information (DCI) format;

transmit, through the at least one transceiver, to the at least one terminal, a second multicast PDSCH based on a second multicast DCI format; and receive, through the at least one transceiver, from a specific terminal, a physical uplink control channel (PUCCH) in which both of first multicast hybrid automatic repeat and request-acknowledgement (HARQ-ACK) information based on a first HARQ-ACK reporting mode and second multicast HARQ-ACK information based on a second HARQ-ACK reporting mode are multiplexed, wherein based on the second multicast DCI format being transmitted after the first multicast DCI format, the PUCCH resource is determined by using the first multicast DCI format, wherein the first HARQ-ACK reporting mode includes generating HARQ-ACK information with an ACK value or with a non-acknowledgement (NACK) value based on whether a transport block is successfully decoded, and wherein the second HARQ-ACK information reporting mode includes not transmitting HARQ-ACK information including only an ACK value and transmitting HARQ-ACK information including a NACK value.

* * * * *